( 12 ) United States Patent
Leard et al.

(10) Patent No.: US 11,656,511 B2
(45) Date of Patent: May 23, 2023

(54) LASER DAMAGE HARDENING OF LIGHT MODULATOR COMPONENTS FOR USE WITH HIGH OPTICAL FLUENCE SYSTEMS

(71) Applicant: Seurat Technologies, Inc., Wilmington, MA (US)

(72) Inventors: Francis L. Leard, Sudbury, MA (US); James A. DeMuth, Woburn, MA (US); Andrew J. Bayramian, Marblehead, MA (US); Drew W. Kissinger, Carlisle, MA (US); Ning Duanmu, Nashua, NH (US); Kourosh Kamshad, Hudson, NH (US)

(73) Assignee: Seurat Technologies, Inc., Wilmington, MA (US)

( * ) Notice: Subject to any disclaimer, the term of this patent is extended or adjusted under 35 U.S.C. 154(b) by 0 days.

(21) Appl. No.: 17/506,349

(22) Filed: Oct. 20, 2021

(65) Prior Publication Data

US 2022/0128848 A1 Apr. 28, 2022

Related U.S. Application Data

(60) Provisional application No. 63/105,066, filed on Oct. 23, 2020.

(51) Int. Cl.
*G02F 1/135* (2006.01)
*G02F 1/1333* (2006.01)

(52) U.S. Cl.
CPC .......... *G02F 1/1355* (2021.01); *G02F 1/1352* (2021.01); *G02F 1/133385* (2013.01); *G02F 2202/12* (2013.01); *G02F 2203/02* (2013.01)

(58) Field of Classification Search
CPC ............ G02F 1/1355; G02F 1/133385; G02F 1/1352; G02F 2202/12; G02F 2203/02
See application file for complete search history.

(56) References Cited

U.S. PATENT DOCUMENTS

| 5,105,289 | A  | * | 4/1992  | Sonehara ............ G02F 1/1396 349/181 |
| 5,124,545 | A  | * | 6/1992  | Takanashi ............ G02F 1/0338 250/214 LA |
| 5,594,567 | A  |   | 1/1997  | Akiyama et al. |
| 5,841,489 | A  |   | 11/1998 | Yoshida et al. |
| 2005/0231662 | A1 | * | 10/2005 | Isozaki ................ G02F 1/1393 348/E9.027 |
| 2006/0065880 | A1 |   | 3/2006  | Tanaka et al. |
| 2007/0019917 | A1 |   | 1/2007  | Bayindir et al. |
| 2012/0105931 | A1 | * | 5/2012  | Deri ..................... G02F 1/0311 359/257 |

FOREIGN PATENT DOCUMENTS

| WO | 2009/075585 | 6/2009 |
| WO | 2015/096193 | 7/2015 |

\* cited by examiner

*Primary Examiner* — Donald L Raleigh
(74) *Attorney, Agent, or Firm* — David R. Stevens; Stevens Law Group

(57) ABSTRACT

An apparatus with first and second transparent conductive oxide layers is described. A photoconductive layer can be positioned between the first and a second transparent conductive oxide layers. The photoconductive layer can be a crystalline layer that can include bismuth silicate or other suitable materials. An electro-optical layer is positioned in contact with the photoconductive layer. In some embodiments the photoconductive layer is positionable to receive a write beam that defines a two-dimensional spatial pattern.

25 Claims, 19 Drawing Sheets

LASER DAMAGE HARDENING OF LIGHT MODULATOR COMPONENTS FOR USE WITH HIGH OPTICAL FLUENCE SYSTEMS

CROSS-REFERENCE TO RELATED PATENT APPLICATION

The present disclosure is part of a non-provisional patent application claiming the priority benefit of U.S. Patent Application No. 63/105,066, filed on Oct. 23, 2020, which is incorporated by reference in its entirety.

TECHNICAL FIELD

The present disclosure generally relates to operation of light modulators, including light transmissive and reflective light valves and pi-cells, in conjunction with high power lasers. More particularly, techniques, components, and materials to allow extended usage of light modulators subjected to high optical fluence.

BACKGROUND

Light modulators can be used to completely or partially block, redirect, or modulate high fluence laser light. For example, a spatial light modulator (SLM), also known as a light valve (LV), is one type of light modulator can be used to impress information equally across the entire beam (1D modulation), provide variation across the beam to form parallelized optical channels (2D modulation), or provide variations across a volume of pixels/voxels channels (3D modulation). The information imposed can be in the form of amplitude, phase, polarization, wavelength, coherency, or quantum entanglement. LVs can include electro-optical devices in which information is transferred onto an incoming optical field through application of a structured force onto a material that allows coupling between optical field and the structured force. Such devices can be composed of an electrical circuit which includes a transparent conductive oxide (TCO, to the incoming optical field, at $\lambda 1$), a photoconductor (PC), and an electro-optical material (EOM). The TCO activates the photoconductor so that a structured force (usually in the form of a low energy/fluence optical field at wavelength $\lambda 2$) is impressed onto the photoconductor as a spatially varying voltage that is then placed across the electro-optic material. The electro-optical material transfers this spatial information to the optical field through reaction with a spatially varying voltage. The optical field exits the device carrying the spatial information in one or more of the attributes listed above.

In the field of metal additive manufacturing (AM), the incoming optical field is a high fluence laser source. Unfortunately, such industrial applications require that LVs withstand high fluence laser sources for a prolonged period of time so as to allow the production of multiple build cycles within a typical shot count in the tens of millions to billions, where the printing of a 2D area is equal to one frame off the LV to the print bed. Thus, a requirement of LV lifetime in a typical industrial system is >10E6 shots and is ideally >10E9 shots. The energy required to print materials in a reasonable time can exceed 8 $J/cm^2$ at the print plane. While various methods can be used to reduce the fluence at the LV, commercially practicable industrial processing requires that the energy density at the LV to be not <2 $J/cm^2$. Existing LVs fail at far below this fluence, making use of existing LVs in metal AM system impractical.

Elements that fail within LVs are commonly the TCO, alignment layers, liquid crystal layers (linear electro-optic or LEO material), or photoconductor layers. The typical TCO is composed of Indium Tin Oxide (ITO), a relatively strong thermal absorber of the laser light used in the AM process. The strong absorption for both the photoconductor and TCO layers occurs over the duration of the laser pulse (ns to ms), and as such can generate very high temperatures if the heat is not allowed to dissipate. Alternatively, this rapid thermal absorption can cause issues if put next to a thermally sensitive material such as the LC alignment layer or LC material itself. Improved techniques, structures, and material are need to meet requirements for high fluence operation of industrial metal AM printers utilizing LV technology.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 1I illustrates a high fluence Reflective PI cell;

FIG. 1O illustrates in top down view a high fluence Square Light Valve or PI cell with 90 degree rotational offset;

DETAILED DESCRIPTION

Figure 1A:
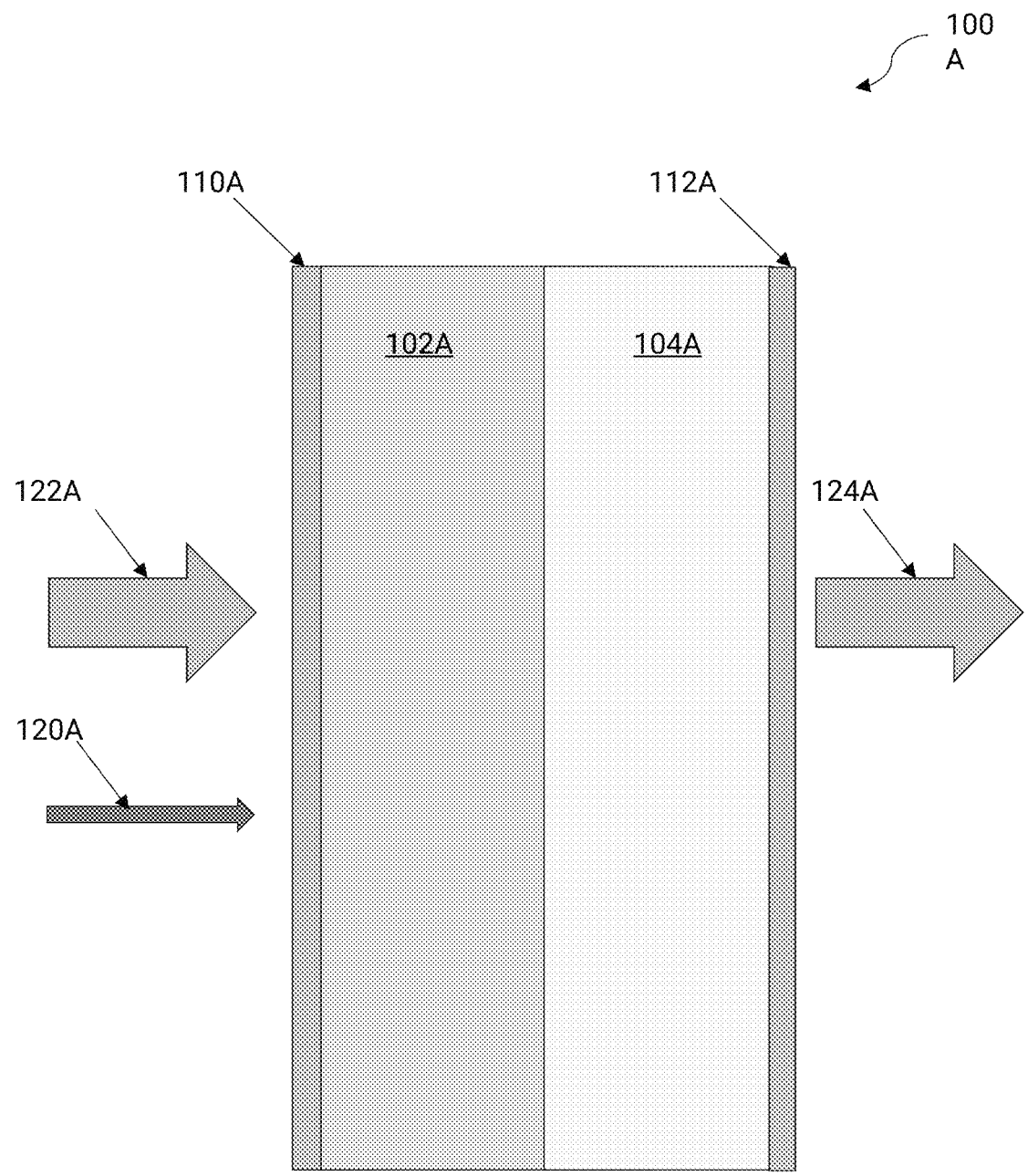
FIG. 1A illustrates a high fluence Light Valve, capable of operating with high intensity light.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

In the following disclosure, improvements to a light modulator system are described. Such improvements can include providing an apparatus with first and second transparent conductive oxide layers. A photoconductive layer can be positioned between the first and a second transparent conductive oxide layers. The photoconductive layer can be a crystalline layer that can include bismuth silicate or other suitable materials. An electro-optical layer is positioned in contact with the photoconductive layer. In some embodiments the photoconductive layer is positionable to receive a write beam that defines a two-dimensional spatial pattern. In other embodiments at least one of a thermally insulative layer and a thermally conductive layer is positioned between the first and second transparent conductive oxide layers. In other embodiments, a thermally conductive top substrate assembly is positioned over an electro-optics assembly with a first transparent conductive oxide layer. A photoconductor assembly with a second transparent conductive oxide layer is also part of the assembly, with the electro-optics assembly and the photoconductor assembly have a same shape. These components can be attached to a supporting thermal conductive substrate assembly.

In some embodiments, a light modulator first and second transparent conductive oxide layers and a photoconductive layer positioned between the first and a second transparent conductive oxide layers, the photoconductive layer having main impurities of less than 5.0% and general impurities of less than 1.0%. An electro-optical layer can be positioned in contact with the photoconductive layer. General impurities can include at least one of H2O (water), Ag, Cd, Cl, Cu, Mg, Na, Pb, SO4, and Zn and main impurities can include at least one of Germanium, Sulfur, and Tungsten. In one embodiment the main impurities are less than 0.1%.

In some embodiments the photoconductive layer is a directly deposited thin film.

In some embodiments the photoconductor layer further comprises one of a doped glass, chalcogenide glass, and quantum dot.

In some embodiments the first and second transparent conductive oxide layers are at least one of an aluminum doped zinc oxide, fluorine doped tin oxide, doped graphene, doped chalcogenide, and exfoliated two-dimensional disulfide.

In some embodiments the first and second transparent conductive oxide layers are directly deposited thin films.

In some embodiments the photoconductive layer is in contact with the first transparent conductive layer, with the photoconductive layer positionable to receive a write beam that defines a two-dimensional spatial pattern.

In some embodiments the electro-optical layer is at least one of a liquid crystal or quantum dot.

In some embodiments the electro-optical layer comprises a liquid crystal layer that contains chiral or dopants to reduce viscosity to less than 0.5 Pa·s.

In some embodiments the electro-optical layer comprises a liquid crystal operated at above 25 C to achieve viscosity less than 0.5 Pa·s.

FIG. 1A illustrates a light valve system 100A with improved high light fluence performance. The system 110A includes a photoconductor layer 102A positioned in direct contact with a crystalline electro-optical (EO) layer 104A. In this embodiment, alignment or impedance matching layers are not required to separate the photoconductor layer 102A from the crystalline electro-optical layer 104A. The combined layers 102A and 104A are bracketed by a transparent conductive oxide (TCO) layers 110A and 112A. In operation, a low power print beam 120A is used to initiate provision by the light valve system 100A of a pixel image or other suitable pattern that controls spatial layout of an incoming high fluence light beam 122A and the resultant outgoing beam 124A. In some embodiments, the photoconductive layer is position able to receive a blue (265 nm to 500 nm) write beam that defines a two-dimensional spatial pattern. The spatial pattern can be a pixel image with binary (black/white) or gray scale pixels.

In some embodiments, the photoconductor layer 102A is predominantly formed with various forms of high purity bismuth silicate oxide (e.g. BSO, such as $Bi_{12}Si_{20}$). The various forms of BSO that can be used as a photoconductor include $Bi_{12}SiO_{20}$, $Bi_2Si_2O_3$, or $Bi_6SiO_{10}$, however other formulations are possible. Use of high purity bismuth silicate oxide is preferred since impurities in the bulk of the material can serve as initiation sites for damage (if they are absorbent to the wavelength light used), and/or act indirectly as a dislocation in a crystal lattice, serving to change the electronic band gap structure, or other mechanism of photon interaction that increase thermal load. Impurities can be controlled in crystals by initially controlling the melt charge ingredient purity level. In the case of BSO, general impurities such as $H_2O$ (water), Ag, Cd, Cl, Cu, Mg, Na, Pb, $SO_4$, and Zn should be kept to below 1.0% (by mass). In some cases, for other BSO and other photoconductors, these impurities should be kept below 1%, and in other cases they should be kept below 0.1%, and in still other cases 0.01%. In the case of BSO, this can be affected by using 99.999% pure charge materials or greater. Some main impurities potentially need to be reduced even further and include S (<22 ppm), Ge (<5 ppm), and W (<2 ppm). Impurity levels are commonly measured by GDMS (Gas Discharge Mass Spectroscopy), FTIR, Raman Scattering, but other techniques are commonly known. Also, the type of crucible used can have a huge effect. Using the right material or the correct purity in the crucible can greatly affect the melt pool. In the case of BSO, this can be achieved by using ultra-pure platinum with a purity of 99.995% or greater. Other crucible materials that can be used with a variety of crystals include but are not limited to steel, tungsten, molybdenum, alumina, iridium, or tantalum. In some cases, these main impurities should be kept below 100 ppm, and in yet other cases they should be kept below 10 ppm, while in yet other cases they should be kept below 1 ppm. Providing such low impurity platinum (which can be present as inclusions) can lead to lower damage threshold as has been observed in phosphate laser glass.

In other embodiments, the photoconductor layer 102A can be a crystalline structure composed of different forms of (BSO) Bismuth Silicate ($Bi_2SO_3$, $Bi_6SiO_{10}$, $Bi_{12}SiO_{20}$, (BGO) Bismuth Germanate (BGO, $Bi_2GeO_3$, $Bi_6GeO_{10}$, $Bi_{12}GeO_{20}$, $Bi_{25}GeO_{39}$), Bismuth Titanite (BTO, $Bi_{12}T_{0.9}O_{19.8}$), Bismuth Zirconate (BZO, $Bi_{38}ZO_{38}$), Bismuth Ferrate (BFO, $Bi_{25}FeO_{39}$), Bismuth Borate (BBO, $Bi_{24}BO_{39}$), Bismuth Aluminum Phosphate (BAPO, $Bi_{24}AlP_{40}$), Bismuth Gallium Phosphate (BGPO, $Bi_{24}GaPO_{40}$), Bismuth Gallium Vanadate (BFVO, $Bi_{24}GaVnO_{40}$), Bismuth Zirconium Vanadate ($Bi_{36}ZnVn_{60}$), Aluminum Zinc Oxide (AZO), Cadmium Sulfide (CdS), Cadmium Selenide (CdSe), Zinc Sulfide (ZnS), Zinc Selenide (ZnSe), Indium Sulfide ($In_2S_3$), Lead Sulfide (PbS), Cadmium Zinc Telluride (CdZTe), doped Germanium (n:Ge, p:Ge) amorphous Silicon (a-Si), doped Silicon (n:Si, p:Si), or Mercury Iodide ($HgI_2$). Additionally, the photoconductor layer of 102A can be composed of doped glass or of chalcogenide glass, quantum dots made from any of the crystals or glasses mentioned above. Additionally, the photoconductor layer could be constructed of an adaptive metamaterial in which is embedded within the construction of metamaterial structure ia thin film version of any of the crystalline, glasses or quantum dots mentioned above. Additionally, the photoconductor could be an optical or photonic antenna that transfers an incoming optical field to a distributed electrical or magnetic field via microscopic or nanoscopic created complex impedance electrical and magnetic circuitry with each element coupled to a patch electrical or magnetic patch antenna.

In some embodiments, the Electro Optic (EO) materials can include Lithium Niobate ($LiNbO_3$), Potassium dihydrogen phosphate (KDP), or Potassium dideuterium phosphate (KD*P), Rubidium Titanyl Phosphate (RTP), Beta Barium Borate/B-Barium Borate/B-$BAB_2O_4$ (BBO), Lithium Triborate ($LiB_3O_5$, or LBO), Potassium Titanyl Phosphate ($KTIOPO_4$ or KTP), Lithium Tantalite ($LiTaO_3$ or LTO). In other embodiments, the EO materials are various types of Liquid Crystals (LC) such as thermotropic, lyotropic, metalotropic. In each type of LC, different phases (stable entropy states) can exist, such as Nematic, Cholesteric, Ferroelectric, Smetic, blue discotic, and conic. Additionally, additives can be added to LC mixtures to enhance their behavior, these additives are sometimes called chiral or dopants to enhance lubricity (inverse of viscosity), birefringence, wavelength selectivity, or actuation method (electrical or magnetic field). In some embodiments nematic phase viscosity is less than 0.5 Pa·s, in yet other embodiments the viscosity is less than 0.1 Pa·s, and in yet other embodiments viscosity is less than 1.0 Pa·s. Liquid crystal devices can also be operated at elevated temperature to reduce viscosity. In some embodiments the liquid crystal is operated at room temperature (25 C), in yet other embodiments it is operated at >25 C, in other embodiments it is operated at >50 C, and in yet other embodiments it is operated at >75 C. Most LCs require an alignment structure/mechanism to create an ordered baseline structure to enable its use in devices and systems. As compared to liquid crystal electro-optical materials, crystalline EO materials have long distance atomic order and do not require alignment layers. Additionally, the EO layer can be deposited onto a supporting substrate, the deposited films can be composed of doped aluminum zinc oxide (AZO, $Al_{1-x}ZnO_x$), doped fluorine tin oxide (FTO, $F_{1-x}ZnO_x$), doped graphene, liquid crystal enhanced metamaterial, doped chalcogenide, exfoliated two-dimensional disulfide, or an optical antennae.

In other cases, the LEO material can be phase change materials such as thin film deposited single or poly crystalline materials such as CdTe, AZO, ZnSe, ZnS, GaTe, GeSbTe, Si, chalcogenide glasses, artificial dielectrics, or metamaterials. Additionally, quantum dots made of any of the materials above and incorporated into a host material (glass or ceramic) to allow manufacturing ease. The requirement for using phase change materials require the refractive index between material states (such as crystalline to amorphous) is changed by more than 10% to be useful for high speed. In yet other embodiments the refractive index change is more than 15%.

In some embodiments, the transparent conductive oxide layers 110A and 112A can be individually or collectively formed from at least one of ITO, ZnO, AZO (If the Al dopant is >15%, then AZO becomes a TCO. If the Al dopant is 1-2%, then it becomes a semiconductor and suitable for a photoconductor. A thin layer of 20% Al dope AZO can be deposited on a surface (thin, <20 nm) followed by 2% Al doped AZO (thick, ~10-20 um) to provide a TCO/Photoconductor stack.), graphene, nanoscopic metal grid array, or GaN. ZnO or GaN are preferred to reduce light absorption at laser light wavelengths commonly used in additive manufacturing. There is generally a direct correlation between laser damage and (inversely with low) resistivity. The range of resistivities that convey high damage threshold to the TCO varies from 500 oms per square (OPS) to 20,000 OPS. The variation depends upon the chemistry thickness and density created during deposition of the film. The range of thickness desired for high fluence TCO is anything less than 50 nm with higher preferences towards <15 nm, and in some embodiments <5 nm. The range of density that confers high threshold tends towards >75% density over 99% of the film's volume.

Figure 1B:
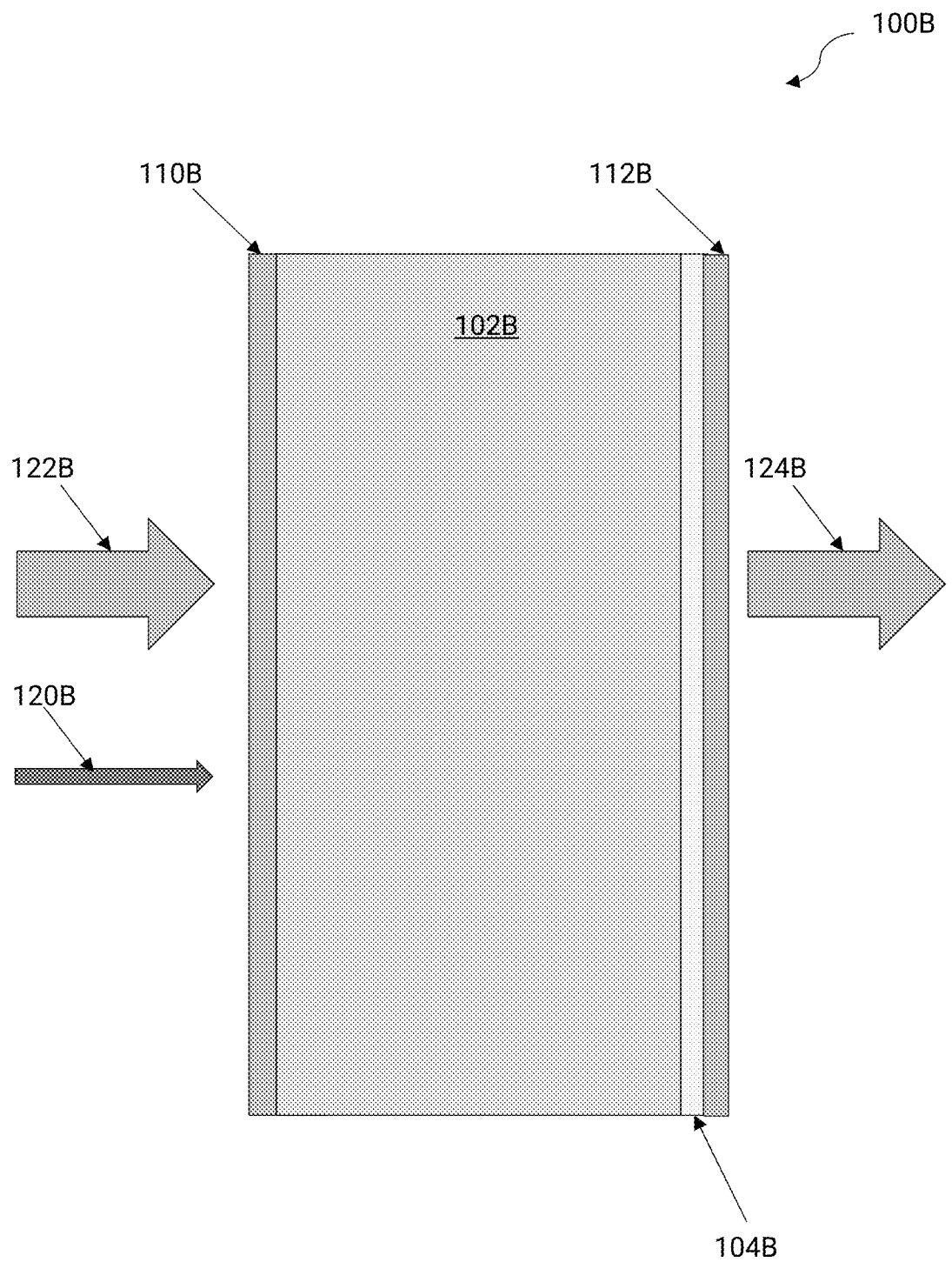
FIG. 1B illustrates a high fluence Light Valve in which the electro-optic layer is replaced with an electro-optic layer that is deposited directly onto the photoconductor layer.

FIG. 1B illustrates an alternative embodiment of a light valve system 100B including some components such as discussed with respect to FIG. 1A. The light valve system 110B includes a photoconductor layer 102B that supports a directly deposited crystalline electro-optical (EO) layer 104B. In this embodiment, alignment or impedance matching layers are not required to separate the photoconductor layer 102B from the crystalline electro-optical layer 104B. The combined layers 102B and 104B are bracketed by a transparent conductive oxide layers 110B and 112B. In operation, a low power print beam 120B is used to initiate provision by the light valve system 100B of a pixel image or other suitable pattern that controls spatial layout of an incoming high fluence light beam 122B and the resultant outgoing beam 124B.

Figure 1C:
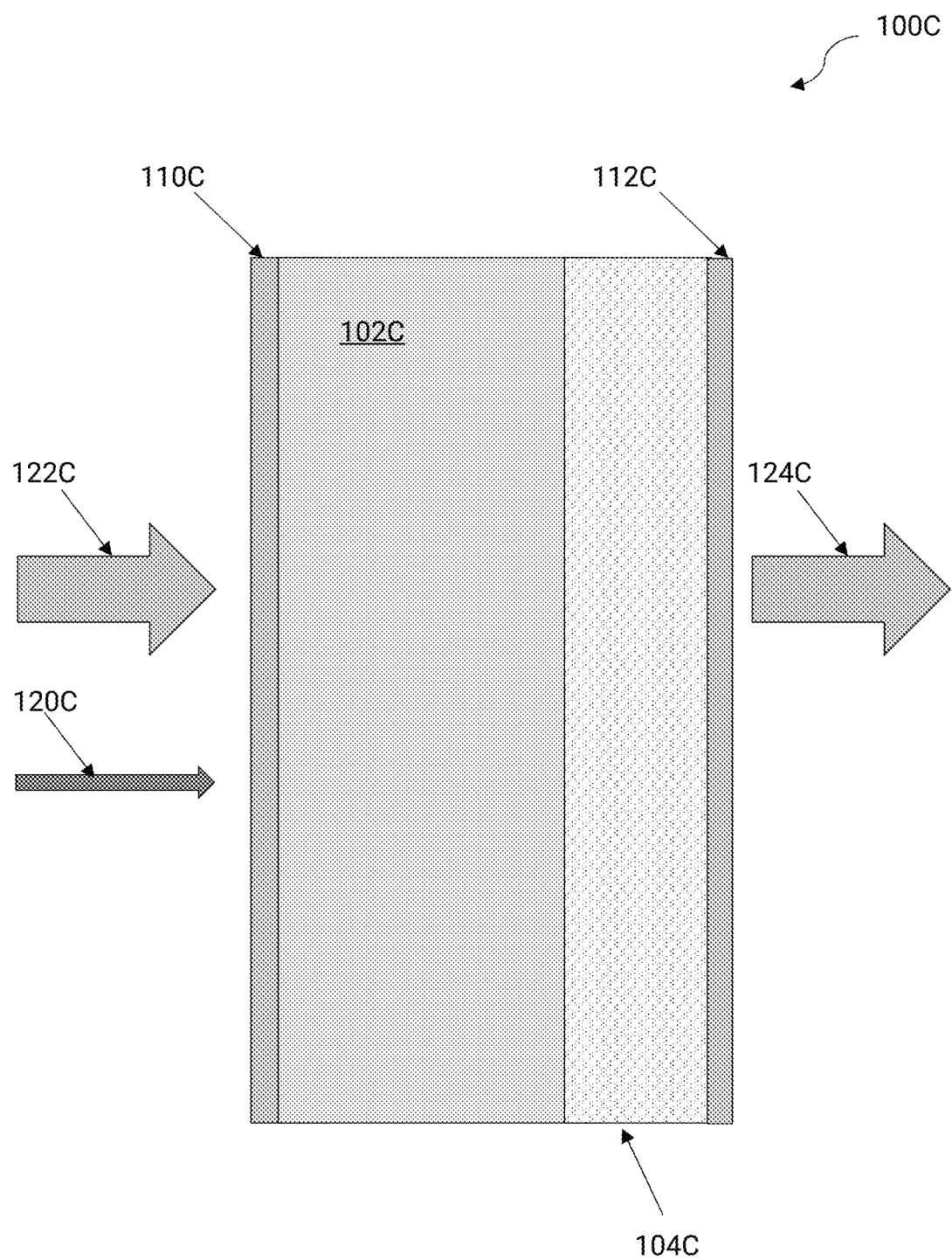
FIG. 1C illustrates a high fluence Light Valve in which the electro-optic layer is replaced by a quantum dot electro-optic layer.

FIG. 1C illustrates an alternative embodiment of a light valve system 100C such as discussed with respect to FIGS. 1A and 1B. The system 100C includes a photoconductor layer 102C and an electro-optical quantum dot layer 104C. In this embodiment, alignment or impedance matching layers are not required to separate the photoconductor layer 102B from the crystalline electro-optical layer 104C. The combined layers 102C and 104C are bracketed by a transparent conductive oxide layers 110C and 112C. In operation, a low power print beam 120C is used to initiate provision by the light valve system 100C of a pixel or other suitable pattern that controls spatial layout of an incoming high fluence light beam 122C and the resultant outgoing beam 124C.

Figure 1D:
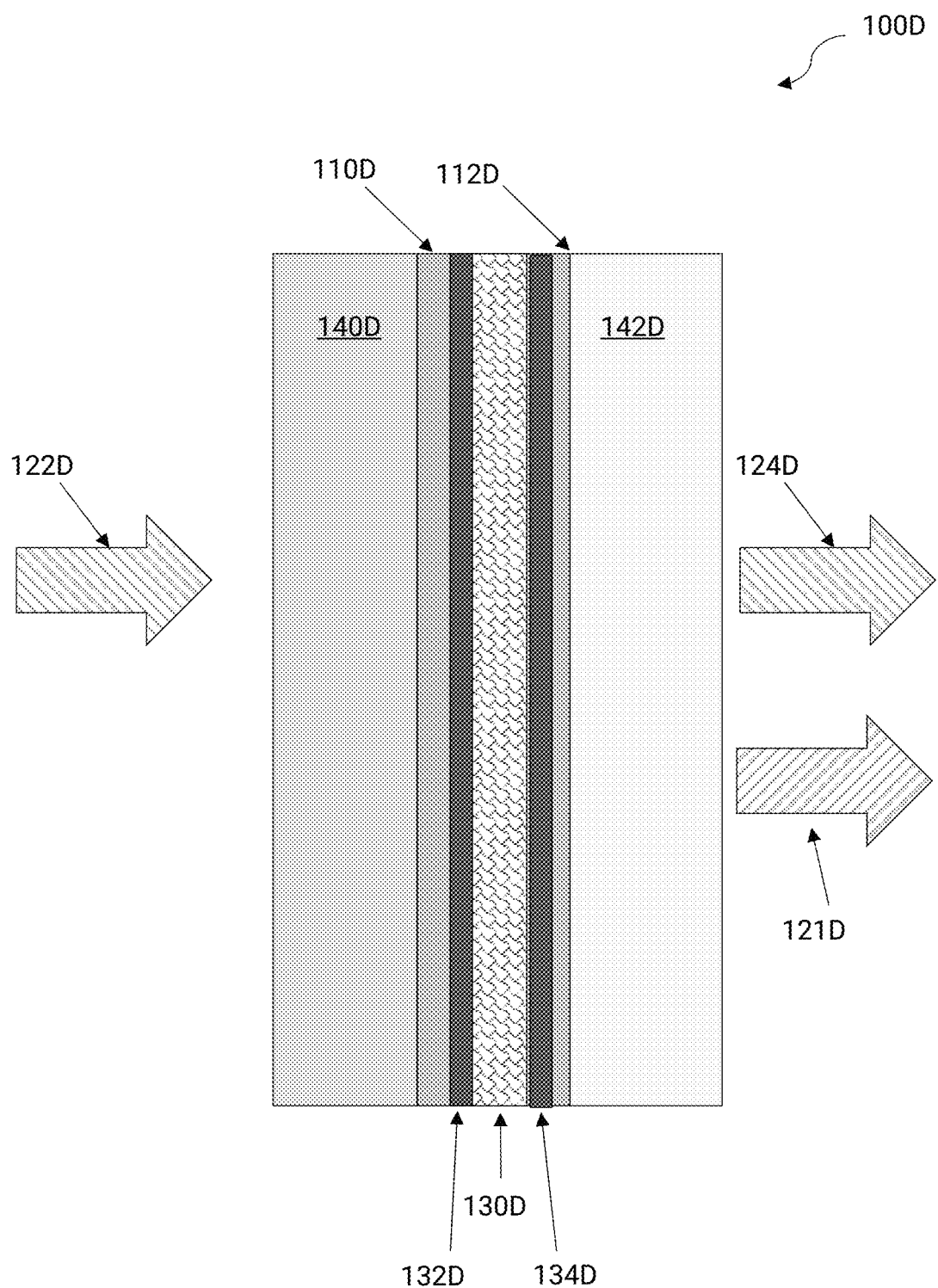
FIG. 1D illustrates a high fluence PI-cell.

FIG. 1D an alternative embodiment of a system 100D that includes a high fluence Pi-cell. A Pi-cell is an electro-optical layer including a liquid crystal cell in which an incoming polarization is switched to an orthogonal polarization upon passage of an activated liquid crystal volume across a clear aperture of the cell. Unlike a light valve system, the Pi-cell is not pixelated across the clear aperture. A PI-cell can perform gray scale by varying the voltage across the Liquid Crystal layer. A high fluence Pi-cell can be used in metal MA printers to address multiple chambers and in switchyard configurations. In a high fluence Pi-cell, high fluence light at kl and polarization 122D enters the Pi-cell through the top substrate 140D and passes through TCO 110D and first alignment layer 132D before entering the liquid crystal layer 130D and passing through the second alignment layer 134D and bottom substrate 142D. If the Pi-cell is not energized, the polarization of the high fluence light is the same as what enters the cell, shown in 124D. If the Pi-cell is energized, the liquid crystal causes the high fluence light to exit the Pi-cell with the orthogonal polarization state, 121D. Gray scale variation between these two extremes can be generated by partially energizing the liquid crystal layer.

Many of the attributes described in this disclosure that are descriptive for TCOs, substrates and electro-optic materials can also be applied to PI cells to harden them against damage under high fluence light. Specifically, the top and bottom substrates can be square (ie 55 mm×55 mm) and offset linearly with respect to each other to allow ease of manufacturing and connectivity to the TCOs; rectangular (i.e. 60×70) so that the top and bottom substrates can be identical while optimizing the clear aperture of the PI cell when assembled; or they can be rotated about the optical axis with respect to each other (ie, Angled or Angled Diamond arrangements) when they are either square or rectangular so as to allow electrification while optimizing clear aperture.

Figure 1E:
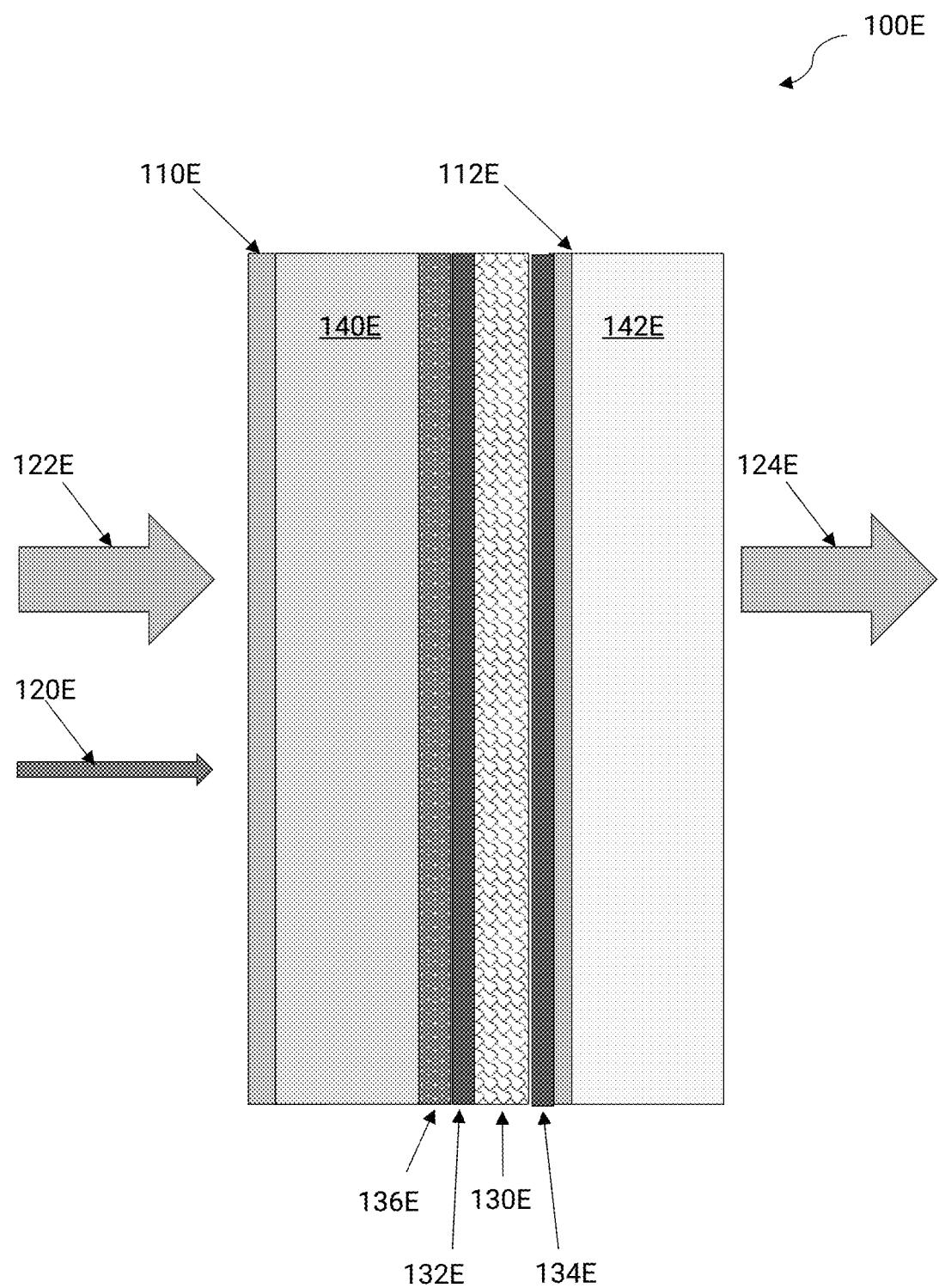
FIG. 1E illustrates a high fluence Light Valve in which a thermally insulative layers separates the photoconductor from the alignment layer.

FIG. 1E illustrates in 100E a high fluence light valve incorporating a thermally insulative layer 136E placed between the photoconductor 140E and an alignment layer 132E. Low power light 120E at λ1 passes through a TCO 110E deposited onto the photoconductor 140E and creates a voltage pattern across linear electro-optic layer 130E. The voltage spatial pattern is applied across the electrical circuit composed of the TCO 110E, the photoconductor 140E, the thermally insulative layer 136E, the alignment layer 132E, the electro-optic layer 130E, the second alignment layer 134E, and terminates on the second TCO layer 112E. The electro-optic layer 130E requires alignment layers 132E and 134E to operate properly. The voltage pattern modifies the electro-optic layer 130E so that it affects the high fluence light 122E at µ2 and imposes a spatial change to the high fluence beam directly related the spatial pattern contained in the low power light 120E. The resulting high fluence beam 122E then passes through the second alignment layer 134E, the second TCO layer 112E and the supporting substrate 142E before leaving the light valve system 100E as 124E carrying with it the spatial pattern imposed on it by the electro-optic layer 130E.

In a light valve not equipped for high fluence operation, the damage produced by the high fluence light initiates on the interface between photoconductor 140E and the first alignment layer 132E. This damage can manifest as a sudden temperature rise on the photoconductor 140E surface where it contacts the alignment layer 132E. The thermal transient is too high for the alignment layer 132E to withstand and it breaks down resulting in destruction of the light valve. The addition of the thermal insulative layer 136E placed at this interface acts to eliminate the alignment layer 132E thermal breakdown by dissipating the thermal transient generated at the photoconductor interface so that the temperature rise seen by the alignment layer 132E is always well below the point of its chemical breakdown.

Figure 1F:
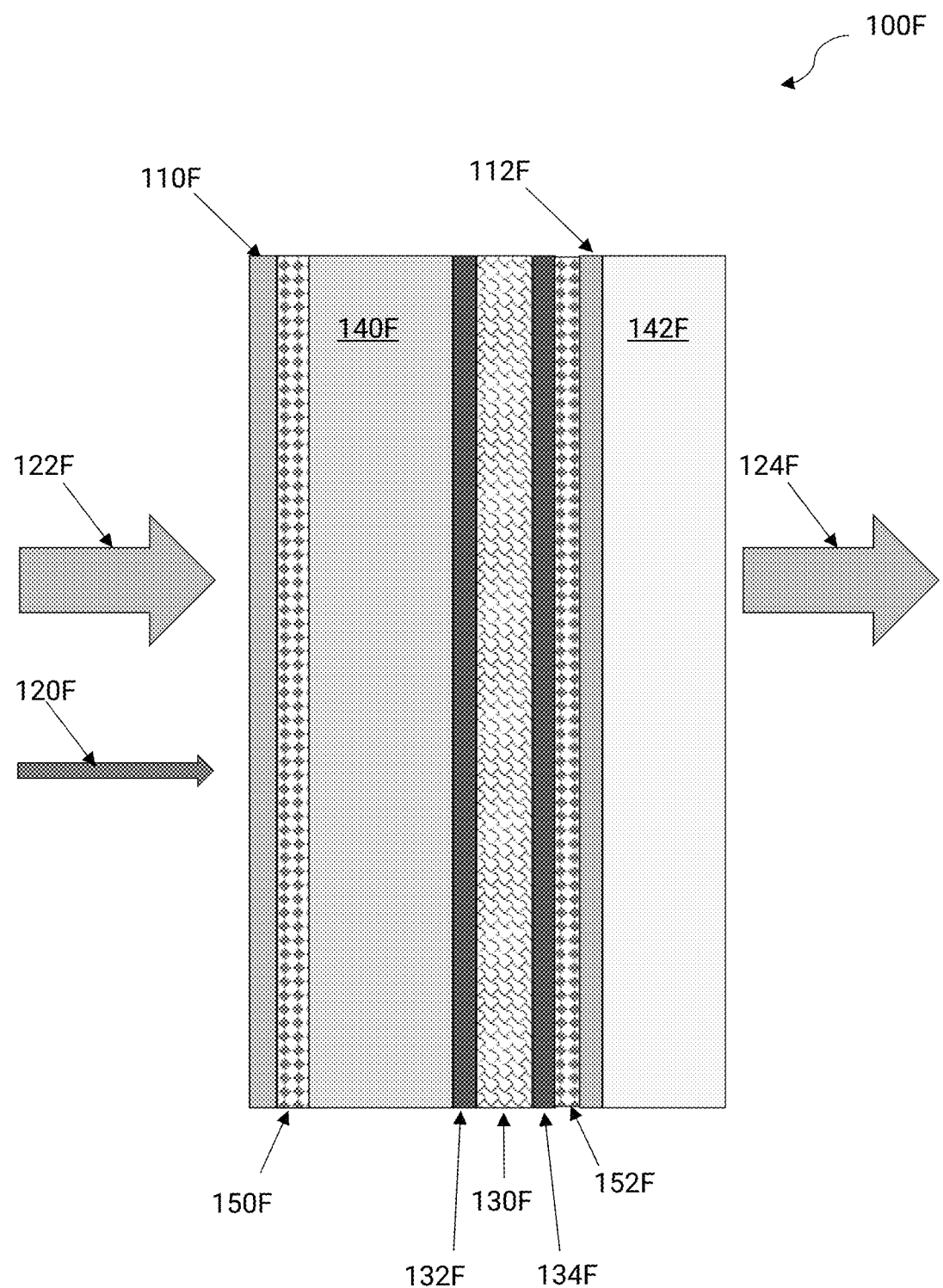
FIG. 1F illustrates a high fluence Light Valve in which thermally conductive layers are placed in contact with the Transparent Conductive Oxide to remove built up heat generated in those layers.

FIG. 1F illustrates system 100F, a high fluence light valve with thermally conductive layers (150F and 152F) built into the light valve structure. Low power light 120F at λ1 passes through a TCO 110F deposited onto the first thermally conductive layer 150F before passing into the photoconductor 140C. The interaction between the low power light 120F and the photoconductor 140F creates a voltage pattern across linear electro-optic layer 130F. The voltage spatial pattern is applied across the electrical circuit composed of the TCO 110F, the thermally conductive layer 150F, the photoconductor 140F, the alignment layer 132F, the electro-optic layer 130F, the second alignment layer 134F, the second thermally conductive layer 152F, and terminates on the second TCO layer 112F. The electro-optic layer 130F requires alignment layers 132F and 134F to operate properly. The voltage pattern modifies the electro-optic layer 130F so that it affects the high fluence light 122F at λ2 and imposes a spatial change to the high fluence beam 122F directly related the spatial pattern contained in the low power light 120F. The resulting high fluence beam 122F then passes through the second alignment layer 134F, the second thermally conductive layer 152F, the second TCO layer 112F and the supporting substrate 142F before leaving the LV system as 124F carrying with it the spatial pattern imposed on it by the electro-optic layer 130F.

In a light valve not equipped for high fluence operation, the damage produced by the high fluence light can also initiate in the TCO layers (110F and 112F). The TCO layers are extremely thin and do not have sufficient volume to propagate and dissipate a fast thermally transient pulse created by the natural TCO absorption when struck by the high fluence beam 122F. The first thermally conductive layer 150F is placed between the first TCO 110F and the photoconductor 140F to thermally dissipate the fast-thermal transient generated either in the first TCO 110F or on the photoconductor's 140F mating interface. The second thermally conductive layer 152F is placed between the second alignment layer 134F and the second TCO layer 112F to thermally dissipate the fast thermal transient generated in the second TCO 134E before the alignment layer 134F experiences a destructive thermal increase to beyond its chemical breakdown. In some instances, these thermally conductive layers (i.e. materials with a thermal conductivity $$> 5 \frac{W}{m*K}$$

such as alumina, sapphire, diamond, structured graphene, or silicon carbide,) can be directly replaced with thermally insulative layers (e.g. materials with a thermal conductivity $$< 5 \frac{W}{m*K}$$

silica, hafnia, sol-gel, or structured foam). In these cases, instead of a heat spreader, they act as a thermal insulator to prevent damage to nearby photoconductor layers 140F or alignment layers 134F.

Figure 1G:
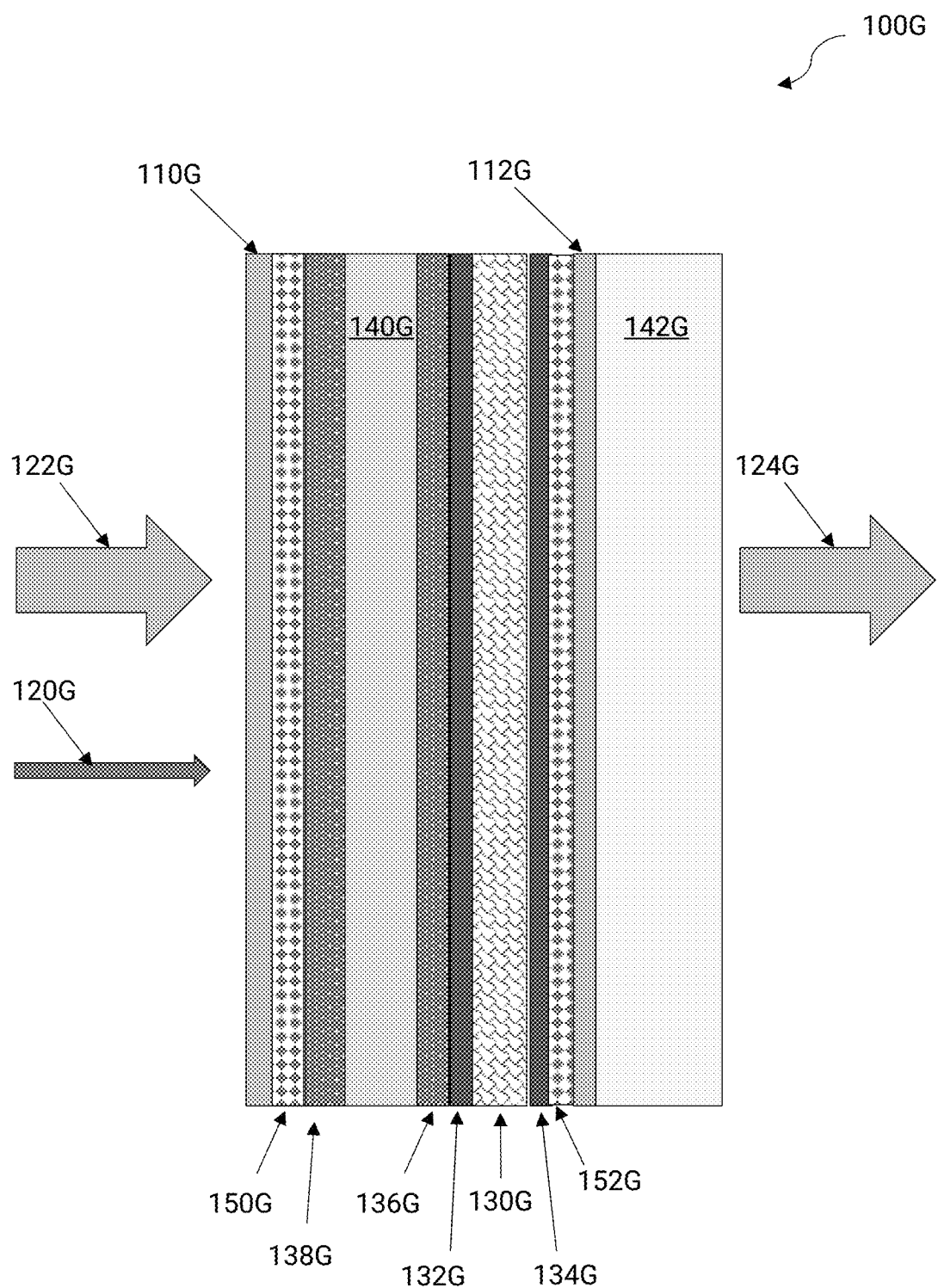
FIG. 1G illustrates a high fluence Light Valve in which thermally conductive layers and insulative layers are added to remove heat where needed and to protect thermally sensitive layers.

FIG. 1G illustrates the inclusion of thermally insulative layers (138G and 136G) and thermally conductive layers (150G and 152G) in a high fluence light valve 100G. Low power light 120G at λ1 passes through the first TCO 110G deposited onto the first thermally conductive layer 150G before passing through the first thermally insulative layer 138G and into the photoconductor 140G. The interaction between the low power light 120G and the photoconductor 140G creates a voltage pattern across the linear electro-optic layer 130G. The voltage spatial pattern is applied across the electrical circuit composed of the TCO 110G, the thermally conductive layer 150G, the first thermally insulative layer 138G, the photoconductor 140G, the second thermally insulative layer 136G, the first alignment layer 132F, the electro-optic layer 130G, the second alignment layer 134G, the second thermally conductive layer 152G, and terminates on the second TCO layer 112G. The electro-optic layer 130G requires alignment layers 132G and 134G to operate properly. The voltage pattern modifies the electro-optic layer 130G so that it affects the high fluence light 122G at λ2 and imposes a spatial change to the high fluence beam 122G directly related the spatial pattern contained in the low power light 120G. The resulting high fluence beam 122G then passes through the second alignment layer 134G, the second thermally conductive layer 152G, the second TCO layer 112G and the supporting substrate 142G before leaving the LV system as 124G carrying with it the spatial pattern imposed on it by the electro-optic layer 130G.

In this embodiment, both thermally conductive layers (150G and 152G) as well as thermally insulative layers (138G and 136G) are used to respectively dissipate thermal transients where they are generated and isolate these transient from damaging the thermally sensitive layers within the light valve. The first thermally conductive layer 150G works in tandem with the first thermally insulative layer 138G. In one embodiment, these two layers are located between the first TCO 110G and the photoconductor 140G since thermal transient can be created either in the first TCO 110G or the photoconductor's 140G interface with 110G. Since the TCO 110G bulk can be insufficient to adequately dissipate the thermal transient created in its volume, the thermally conductive layer 150G is used to dissipate this thermal transient before it can chemical destroy the TCO 110G. The thermal transient generated in the photoconductor's 140G interface with 110G is isolated by the thermally insulative layer 138G while any residual thermal transient getting through 138G is quickly dissipated by 150G, protecting the TCO 110G from any potential damage from thermal transient of this interface. The second thermally insulative layer is located between the photoconductor 140G and the first alignment layer 132G and protects 132G from experiencing a potentially destructive thermal transient from this interfacial heating. The second thermally conductive layer 152G is placed between the second alignment layer 134G and the second TCO layer 112G to dissipate any thermal transient generated in the TCO. The thermally conductive layer 152G protects both the TCO 112G and alignment layer 134G from experiencing potentially dangerous thermal transients by quickly dissipating the transients before these layers undergo chemical breakdown.

Figure 1H:
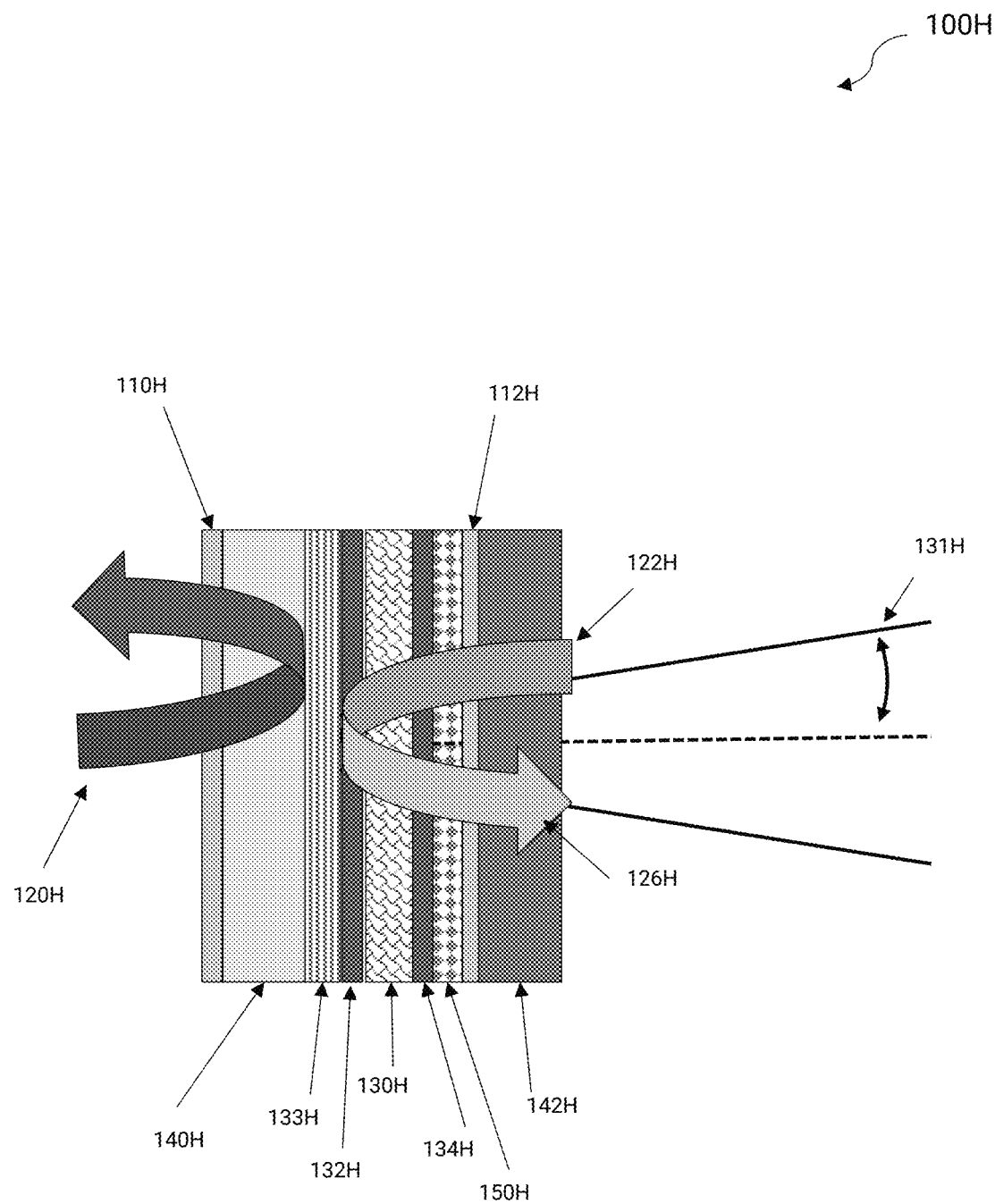
FIG. 1H illustrates a high fluence Reflective Light Valve.

FIG. 1H illustrates a high fluence reflective light valve (RLV) 100H in which the low fluence write beam at λ2 (120H) enters the high fluence reflective light valve through TCO 110H and enters the photoconductor layer 140H and reflects off a high reflector mirror (HRM) 133H. The low fluence light exits the light valve by passing back through 140H and 110H before exiting the system. The high fluence light 122H enters the reflective light valve by passing through the supporting substrate 142H, the TCO 112H, the alignment layer 134H, the EO layer 130H, the alignment layer 132H and reflects of the HRM 133H before traversing 132H, 130H, 134H, 112H, and 142H before leaving the RLV (126H). In some cases, the use of a thermally insulative layer 150H can be utilized to decrease thermal effects which could induce damage in the alignment layer 134H and the EO layer 130H. The incoming 122H makes an angle 131H with the outgoing 126H. In some embodiments, this angle (131H) can vary anywhere between 3°→8° with a variance of ±2° at any one angle. In some embodiments this angle can be 0 deg and in other embodiments this angle could be as large as 60 deg. At higher angles image distortion is a concern as are polarization effects to the contrast. The 133H is constructed so that it has >70% reflectivity for 265 nm→500 nm while also having >99.5% for 950 nm→1070 nm. When 130H layer is composed of liquid crystal, this layer can be structured so as to be a multi-quarter wave retarder including a single or double quarter wave, can be one of an electronically controlled birefringence (ECB), twisted nematic (TN) or chiral enhanced cell. The benefit of using 133H is to isolate the LC and PI cells away from UV/blue exposure as these two materials. Both the LC and PI layers degrade in the presence of UV/blue light which makes these materials more sensitive to being damaged by the HFL. The benefit of the double pass through 140H by 120H is that 140H can be reduced in thickness (halving) or shifting 120H to a longer wavelength; both actions reduce the damage threshold of 140H by 120H.

FIG. 1I illustrates a high fluence Reflective PI cell 100I in which the high fluence light 122I enters through the supporting substrate 142I and travels through TCO 112I, alignment layer 134I, liquid crystal 130I, alignment layer 132I and off the HRM 133I. The high fluence beam reflects off 133I, travels back through 132I, 130I, 134I, 112I, and 100I via 142I. When the PI cell is not energized, the incoming polarization of 122I is the same as the outgoing high fluence polarization light 125I. When the RLV is energized, the outgoing polarization of the high fluence beam is changed via 130I into the orthogonal polarization 126I as it leaves the RLV. The incoming 122I makes and angle 131I with the outgoing 125I/126I light with this angle (131I) can vary anywhere between 3°→8° with a variance of ±2° at any one angle. The 133I is constructed so that its reflectivity is >99.5% for 950 nm→1070 nm. The PI cell is electrically activated by applying an electrical signal between TCO 112I and TCO 140I, causing the entire PI cell to be active to one state determined by this electrical signal. The electrical signal can be binary (fully activated or fully inactivated) or gray scale (any variation between fully activated to fully inactivated).

Figure 1L:
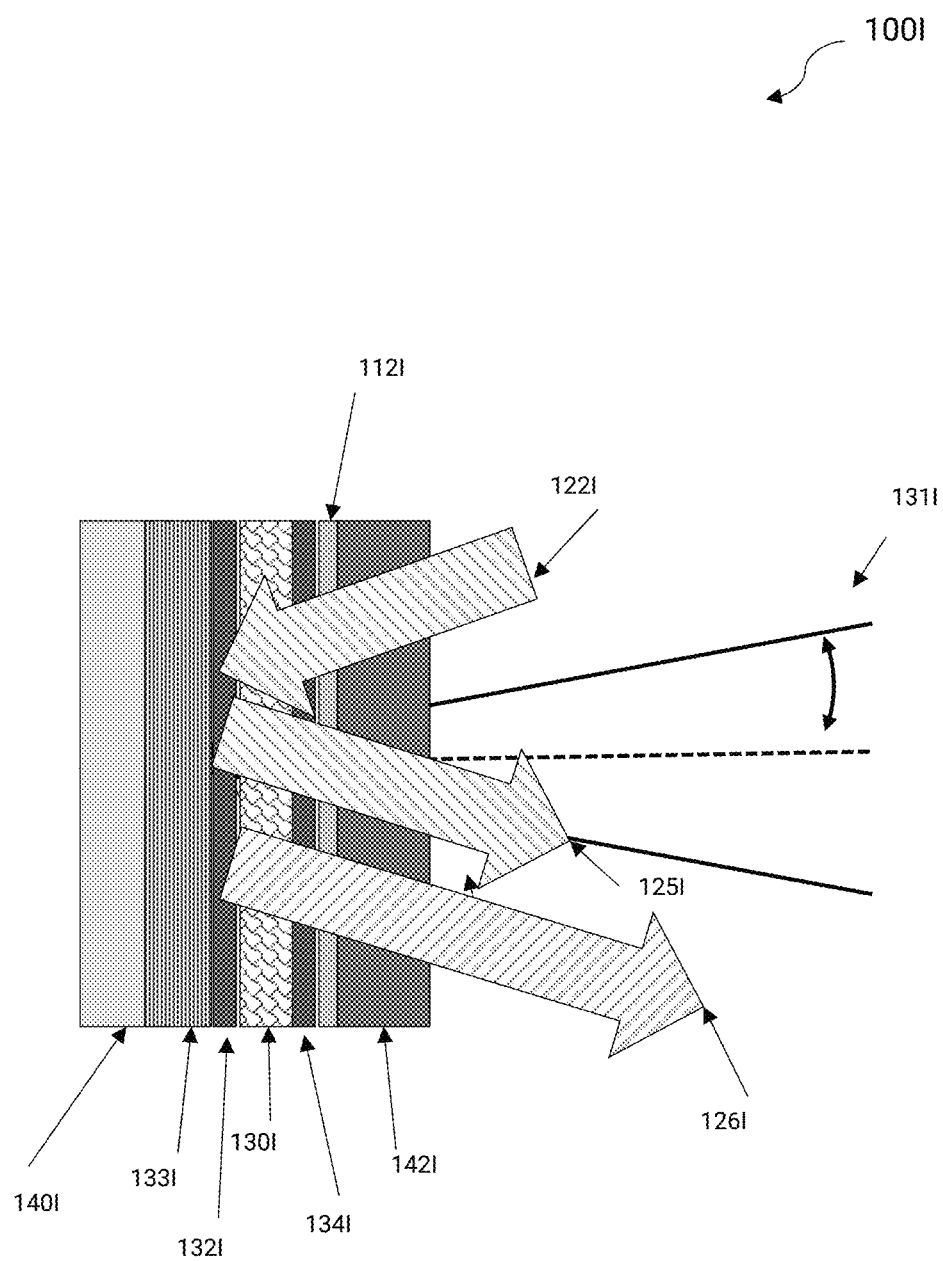
FIG. 1L illustrates an exploded view of a high fluence composite Light Valve or PI cell.
Figure 1J:
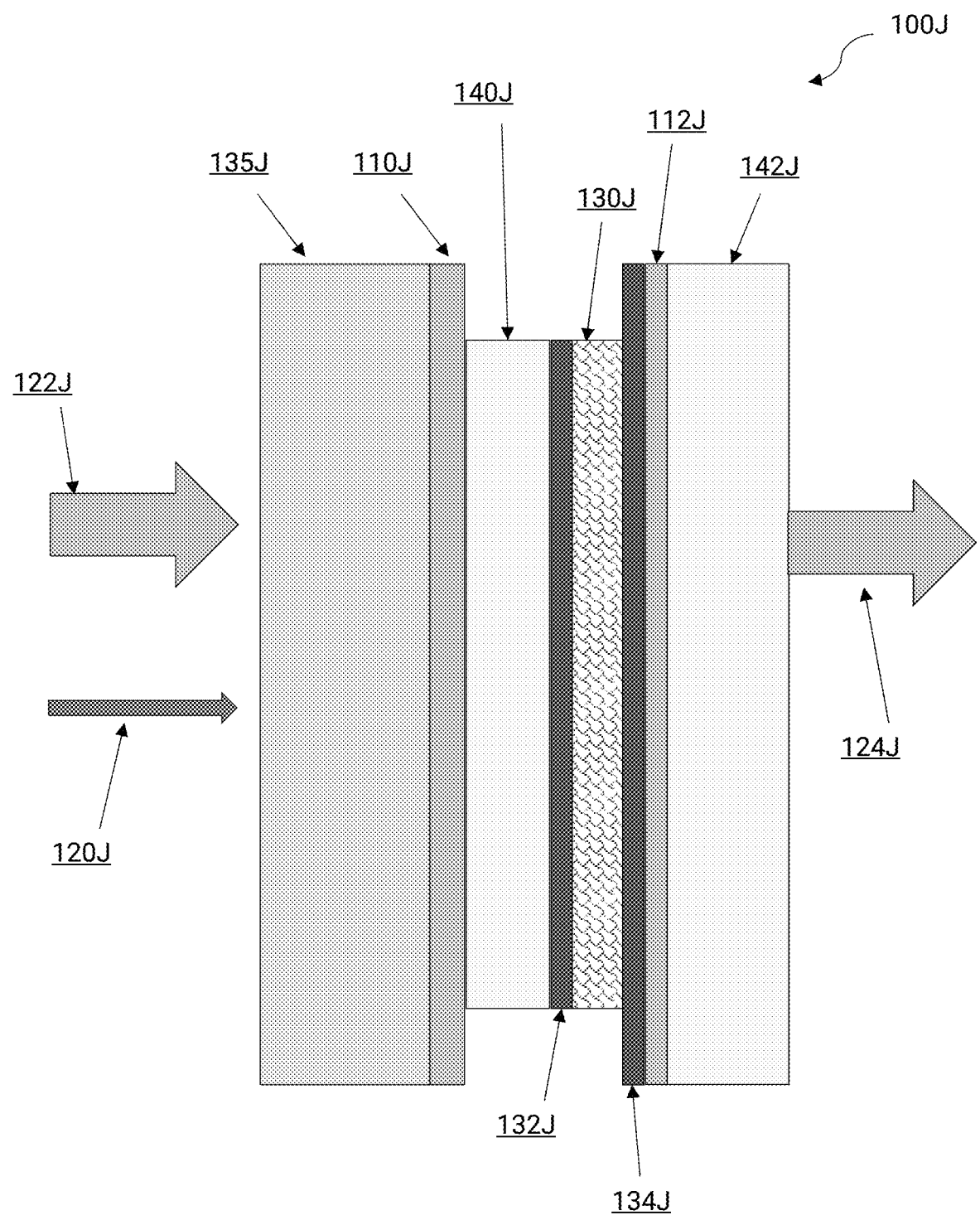
FIG. 1J illustrates a high fluence Composite Light Valve.

FIG. 1J illustrates a Composite Light Valve 100J in transmissive light valve configuration. The high fluence light 122J enters 100J through the first support substrate 135J and passes through the TCO 110J, the photoconductor layer 140J, the alignment layer 132J, the EO layer 130J, the alignment layer 134J, the TCO 112J, the supporting substrate 142J before exiting 100J along the exit high fluence beam 124J. The low fluence write beam 120J enters into 100J by passing into 135J, through 110J and into 140J where it creates free carriers and allows the spatial voltage to be applied across 130D with respect to 112J. An alternative embodiment is for this to be configured in a reflective configuration where the interface between the photoconductor 140J and the alignment layer 132J is a reflective coating with properties like what is described in FIG. 1H.

Figure 1K:
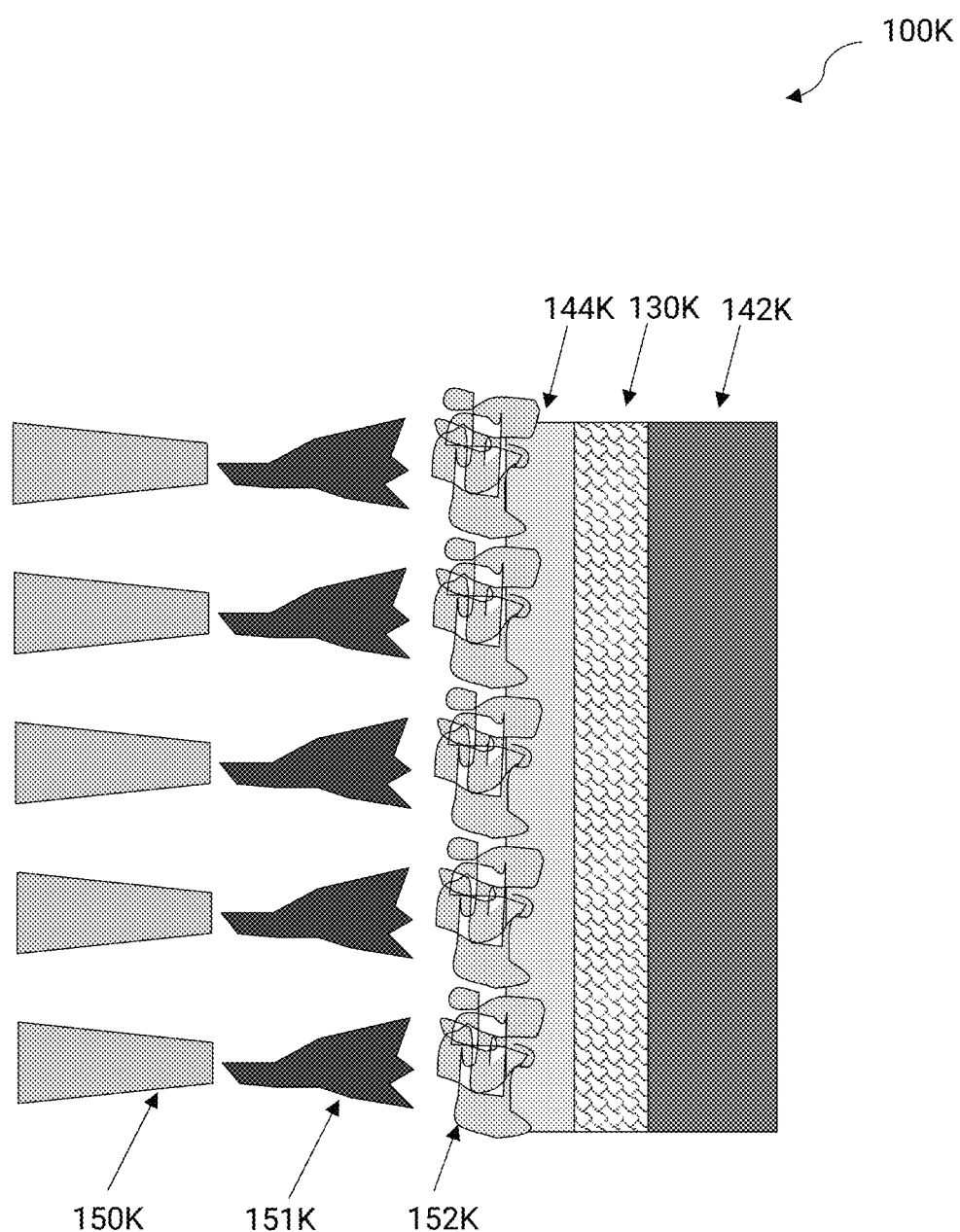
FIG. 1K illustrates use of phase-changing coolant as it is sprayed in its liquid phase onto the hot side of a high fluence light valve.
Figure 1L:
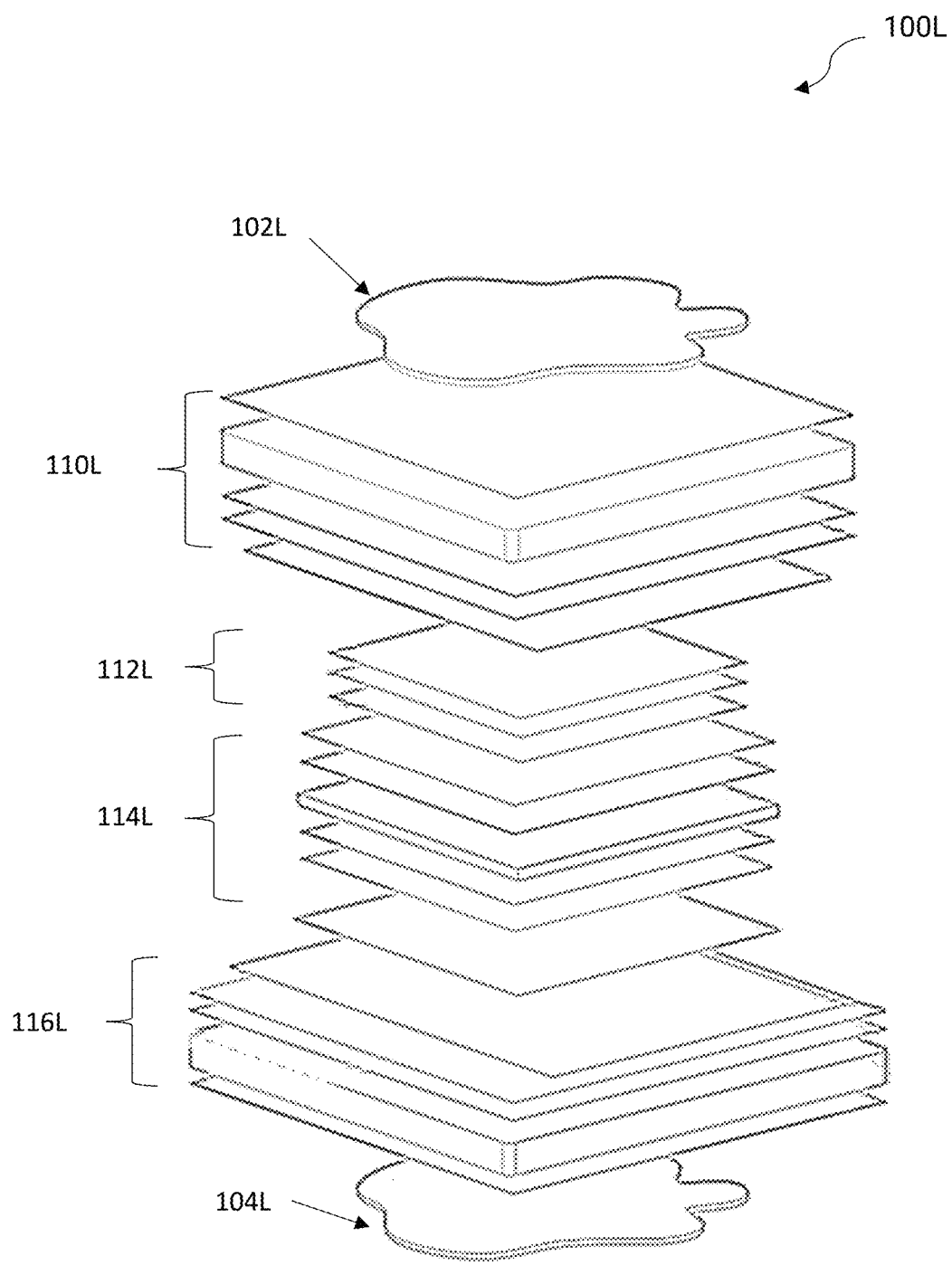

FIG. 1K illustrates the use of phase change cooling 100K within a light valve structure. This method of cooling can be used in either a transmissive or reflective light valve structure, the reflective light valve depicted here is to aid clarity of its teaching. An array of cooling nozzles 150K transport and control the speed and volume of the phase change fluid 151K as the liquid sprays onto the hot side of a reflective light valve composed of a hot layer supporting substrate 144K, a reflecting light modifying structure 130K, and a secondary supporting structure 142K. The cooling liquid 151K undergoes a phase change from liquid to vapor 152K through the action of expansion from the nozzles 150K and the temperature of the hot supporting structure 144K. The phase transition (heat of fusion) of a liquid greatly enhances its capacity to absorb heat. The speed at which the fluid/gas flows across and interacts with the hot substrate also enhances the fluid/gas capacity to absorb heat. Increasing the turbulence of the gas phase 152K at the hot substrate 144K interface additionally increases the ability to absorb heat and allows the system to work in high fluence light. The selection of cooling fluid 151K, the design and construction of the nozzles 150K, and amount of designed turbulence of the liquid to gas phase transition 152K all greatly enhances the ability of any light valve to handle absorption generated in a high fluence system.

FIG. 1L illustrates one embodiment of a composite high fluence light valve 100L. The composite LV 100L can be placed into an enclosure (not shown) which allows a cooling fluid (102L and 104L) to flow and provide heat removal. The composite LV 100L includes a thermal conductive top substrate assembly (110L), an electro-optics assembly (112L), a photoconductor assembly (114L), and a supporting thermal conductive substrate assembly (116L). Both 114L and 116L are mechanically connected in a manner that permits the flatness and mechanical strength of 116L to be transferred throughout 114L. Additionally, this intimate contact between 114L and 116L allows rapid heat removal from 114L to enable 114L to attain a much higher damage threshold otherwise. In addition, 114L can undergo less processing as these steps are transferred to 116L prior to attachment to 114L. In addition, recovery of 114L is possible due to the connection to a more robust material that can be chosen for 116L, with potential multiple recoveries possible in this arrangement.

Figure 1M:
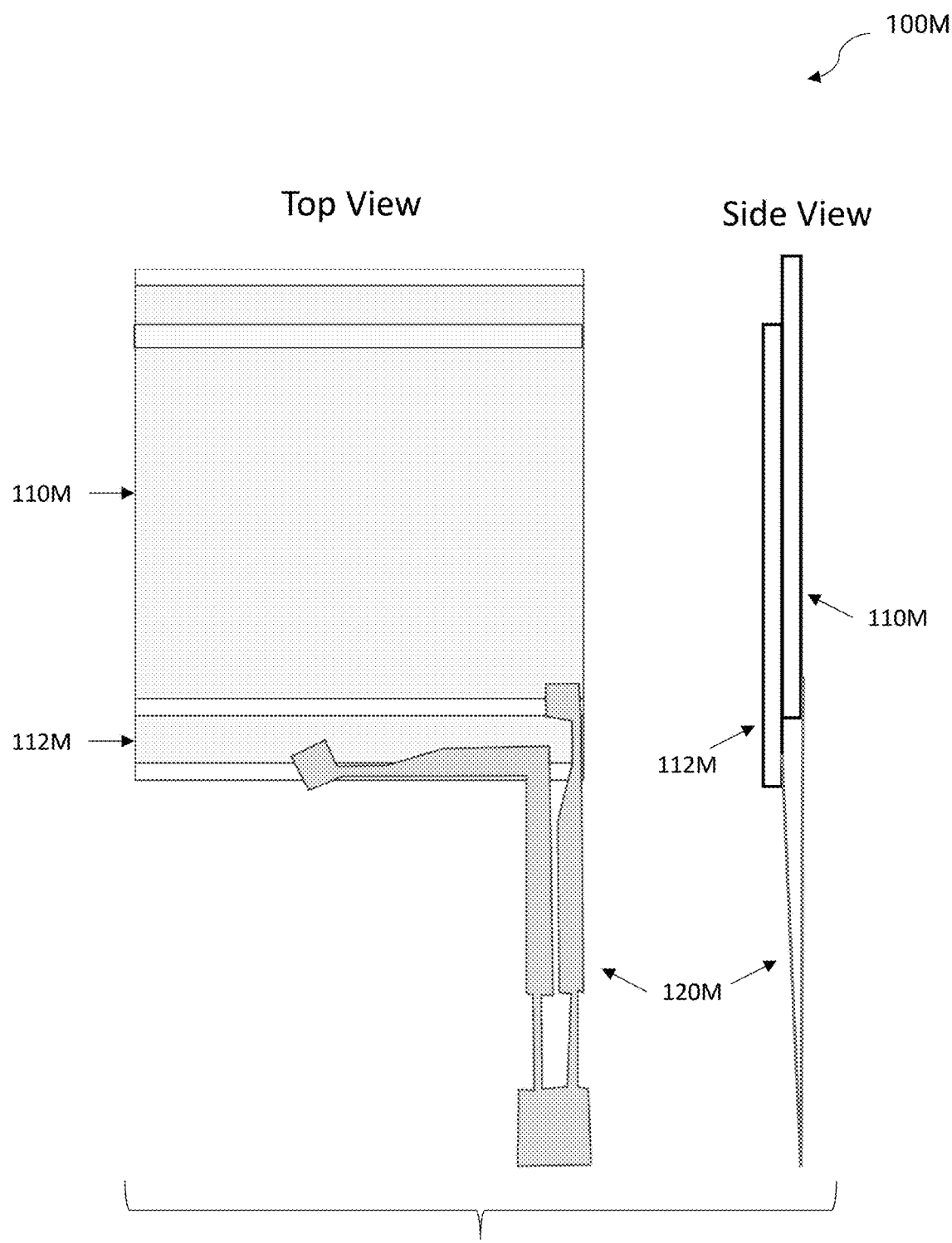
FIG. 1M illustrates in top down and side view a high fluence Square Light Valve or PI cell with lateral offset.

FIG. 1M illustrates the construction of one embodiment of a high fluence LV or PI cell such as discussed herein, constructed with TCO layer-containing substrates (110M and 112M) of substantially identical shape (e.g. circular, ovoid, hexagonal, rectangular, or square) and size. Both a top view and side view are indicated. For the cell to be electrically connected (via 120M), the two substrates need to be laterally offset from each other to all connection to the TCO layers. Increasing the photoconductor layer to larger areas allows the LV to accept higher fluence or reduce the incident fluence by spreading it over a larger area. A similar effect can be seen when this method is applied to a PI cell and in which case, a lower quality/cost substrate can be substituted for the exiting thermally conductive substrate for the same fluence or the exiting PI cell can withstand a greater fluence. These substrates can be of equal size and can be larger than 30×30×1 mm, 40×40×2 mm, 44×44×3 mm, 55×55×2 mm, or 100×100×5 mm. The thickness of the substrates could be greater than 1 mm, greater than 3 mm, greater than 4 mm, or greater than 10 mm.

Figure 1N:
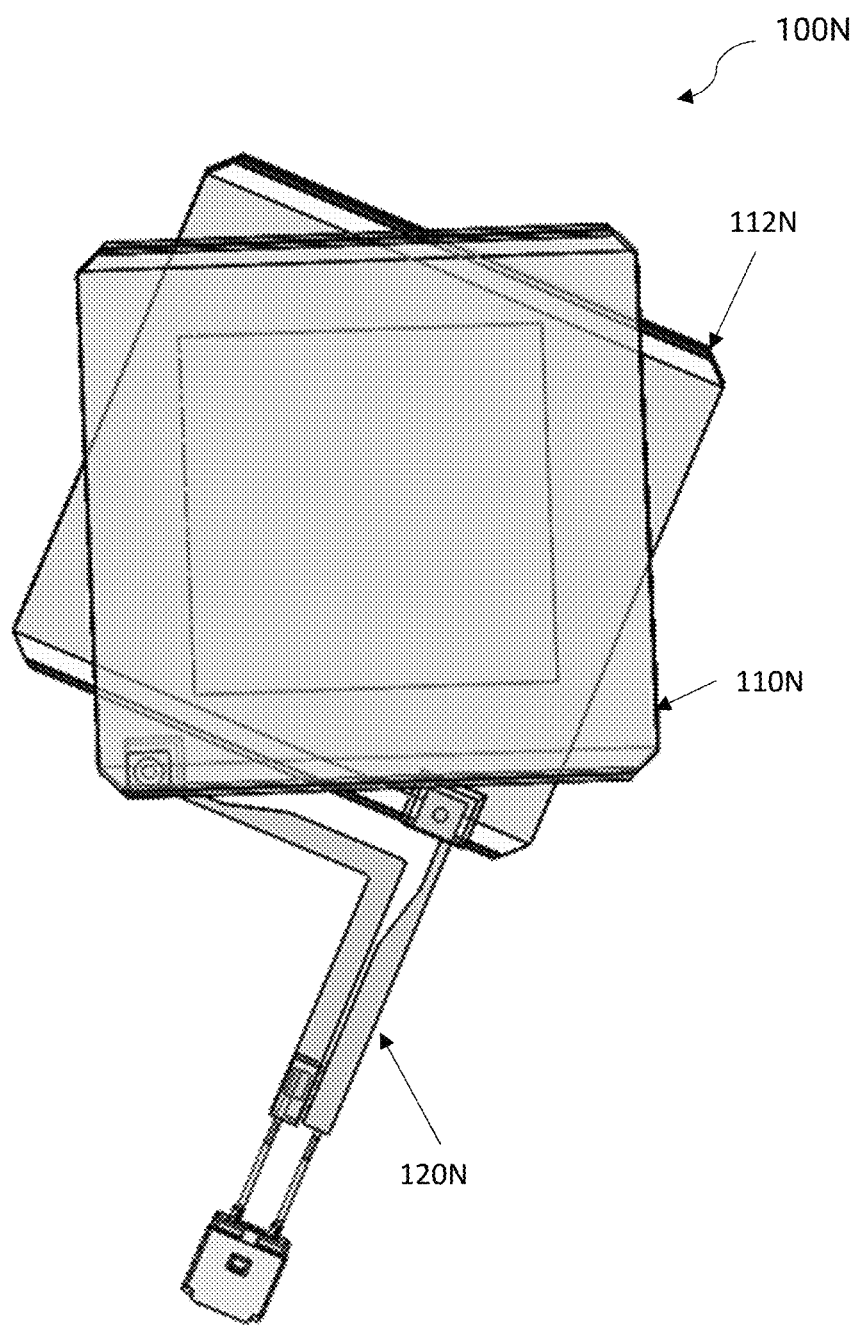
FIG. 1N illustrates in top down view a high fluence Square Light Valve or PI cell with 45 degree rotational offset.
Figure 10:
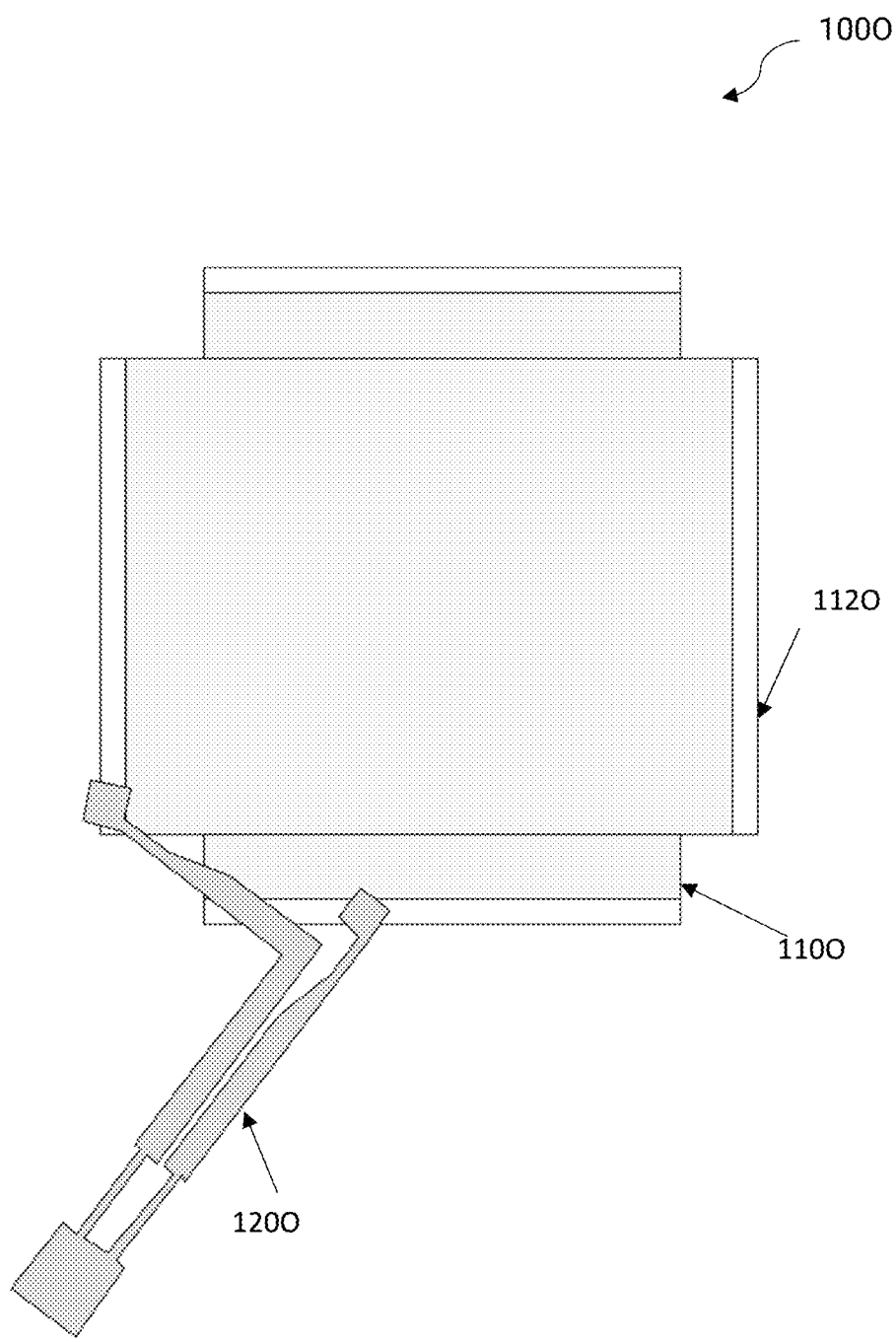

FIG. 1N illustrates a structure orientation change which increases an active region of a LV or PI cell as also discussed herein with respect to FIG. 1D and other embodiments. In some embodiments, equally sized square substrates (110N and 112N) are positioned through offset rotation of one substrate with respect to the other. This configuration is called an angled configuration, normally with 112N rotated 45 degrees to that of 110N. Maximal overlap area is attained by using what is called an angled diamond in which 112N is rotated more or less than 45 degrees with respect to 110M. Electrification is attained through a similar connection to prior configurations via 120N. These substrates can be of equal size and can be larger than 30×30×1 mm, 40×40×2 mm, 44×44×3 mm, 55×55×2 mm, or 100×100×5 mm. The thickness of the substrates could be greater than 1 mm, greater than 3 mm, greater than 4 mm, or greater than 10 mm.

FIG. 1O illustrates the construction of high fluence LV or PI cell constructed with rectangular and equally sized substrates (110O and 112O). In this type of configuration, the two substrates are aligned along their mutual centers, but 112O is rotated about 90 degrees with respect to 110O, allowing for electrification to be more easily attained via 120O. This configuration permits better mechanical stability when placed into a cooling housing and results in less vibration when cooling fluid is applied to the various surfaces. These substrates can be larger than 60×70×5 mm in dimensional volume, but other configurations could be larger than or equal to 30×40×2 mm or 40×50×2 mm or 50×60×3 mm or 100×110×4 mm or 200×210×10 mm. The thickness of the substrates could be greater than 1 mm, greater than 3 mm, greater than 4 mm, or greater than 10 mm.

Figure 2:
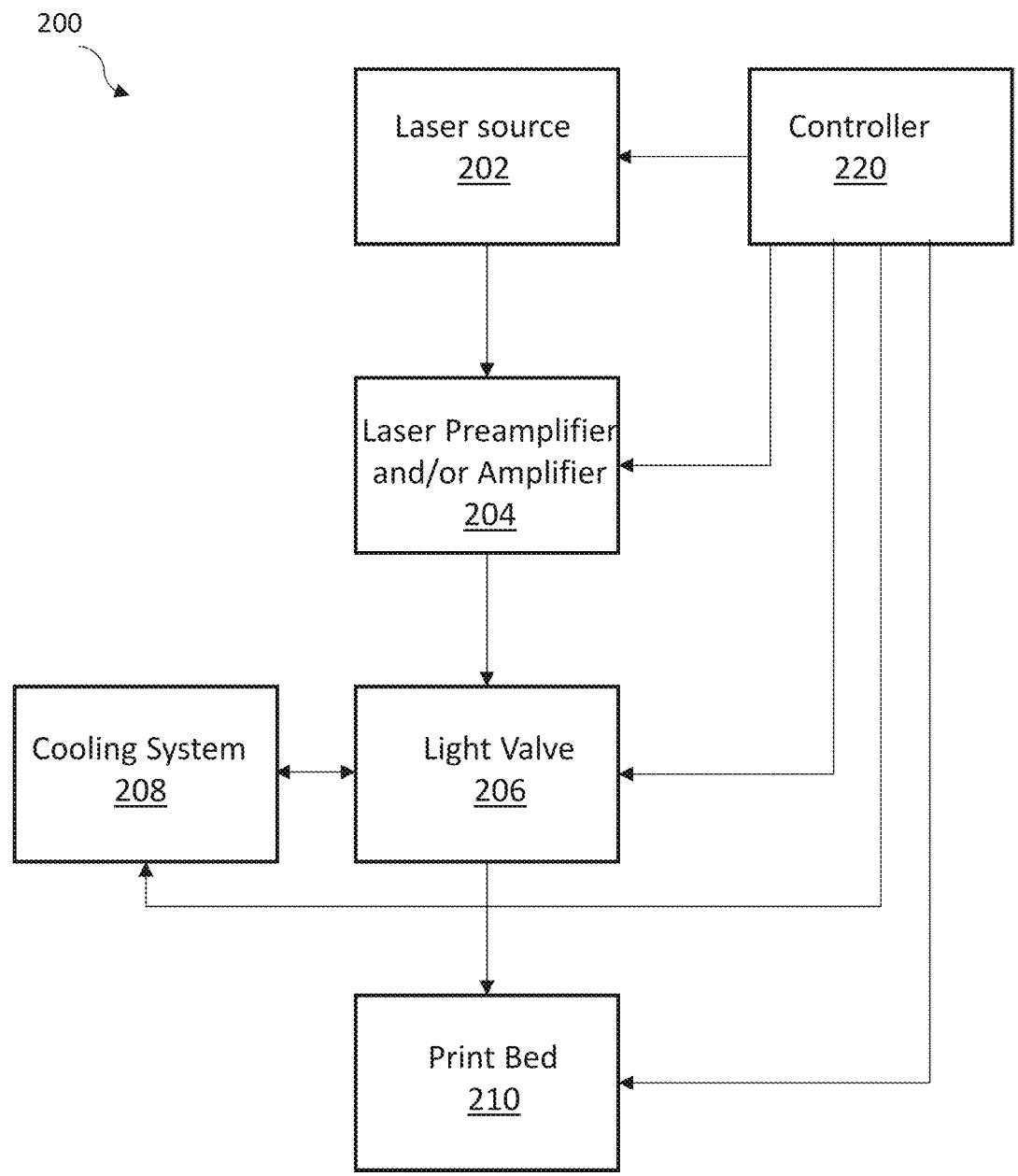
FIG. 2 illustrates a block diagram of a high fluence light valve based additive manufacturing system.

FIG. 2 illustrates use of a light valve based additive manufacturing system 200. A laser source 202 directs a laser beam through a laser preamplifier and/or amplifier 204 into a light valve 206 such as discussed with respect to FIGS. 1A-H. After patterning, light can be directed into a print bed 210. The light valve 206 can be attached to an additional active or passive cooling system 208. Overall operation of the light valve based additive manufacturing system 200 can controlled by one or more controllers 220 that can modify laser power and timing.

In some embodiments, possible laser types include, but are not limited to: Gas Lasers, Chemical Lasers, Dye Lasers, Metal Vapor Lasers, Solid State Lasers (e.g. fiber), Semiconductor (e.g. diode) Lasers, Free electron laser, Gas dynamic laser, "Nickel-like" Samarium laser, Raman laser, or Nuclear pumped laser.

A Gas Laser can include lasers such as a Helium-neon laser, Argon laser, Krypton laser, Xenon ion laser, Nitrogen laser, Carbon dioxide laser, Carbon monoxide laser or Excimer laser.

A Chemical laser can include lasers such as a Hydrogen fluoride laser, Deuterium fluoride laser, COIL (Chemical oxygen-iodine laser), or Agil (All gas-phase iodine laser).

A Metal Vapor Laser can include lasers such as a Helium-cadmium (HeCd) metal-vapor laser, Helium-mercury (HeHg) metal-vapor laser, Helium-selenium (HeSe) metal-vapor laser, Helium-silver (HeAg) metal-vapor laser, Strontium Vapor Laser, Neon-copper (NeCu) metal-vapor laser, Copper vapor laser, Gold vapor laser, or Manganese (Mn/$MnCl_2$) vapor laser. Rubidium or other alkali metal vapor lasers can also be used. A Solid State Laser can include lasers such as a Ruby laser, Nd:YAG laser, NdCrYAG laser, Er:YAG laser, Neodymium YLF (Nd:YLF) solid-state laser, Neodymium doped Yttrium orthovanadate(Nd:$YVO_4$) laser, Neodymium doped yttrium calcium oxoborateNd:$YCa_4O(BO_3)^3$ or simply Nd:YCOB, Neodymium glass(Nd:Glass) laser, Titanium sapphire(Ti:sapphire) laser, Thulium YAG (Tm:YAG) laser, Ytterbium YAG (Yb:YAG) laser, Ytterbium:$2O_3$ (glass or ceramics) laser, Ytterbium doped glass laser (rod, plate/chip, and fiber), Holmium YAG (Ho:YAG) laser, Chromium ZnSe (Cr:ZnSe) laser, Cerium doped lithium strontium (or calcium)aluminum fluoride(Ce:LiSAF, Ce:LiCAF), Promethium 147 doped phosphate glass(147 $Pm^{+3}$:Glass) solid-state laser, Chromium doped chrysoberyl (alexandrite) laser, Erbium doped anderbium-ytterbium co-doped glass lasers, Trivalent uranium doped calcium fluoride ($U:CaF_2$) solid-state laser, Divalent samarium doped calcium fluoride($Sm:CaF_2$) laser, or F-Center laser.

A Semiconductor Laser can include laser medium types such as GaN, InGaN, AlGaInP, AlGaAs, InGaAsP, GaInP, InGaAs, InGaAsO, GaInAsSb, lead salt, Vertical cavity surface emitting laser (VCSEL), Quantum cascade laser, Hybrid silicon laser, or combinations thereof.

In some embodiments, various preamplifiers or amplifiers 204 are optionally used to provide high gain to the laser signal, while optical modulators and isolators can be distributed throughout the system to reduce or avoid optical damage, improve signal contrast, and prevent damage to lower energy portions of the system 200. Optical modulators and isolators can include, but are not limited to Pockels cells, Faraday rotators, Faraday isolators, acousto-optic reflectors, liquid crystal based optical cells, or volume Bragg gratings. Pre-amplifier or amplifiers 204 could be diode pumped or flash lamp pumped amplifiers and configured in single and/or multi-pass or cavity type architectures. As will be appreciated, the term pre-amplifier here is used to designate amplifiers which are not limited thermally (i.e. they are smaller) versus laser amplifiers (larger). Amplifiers can be positioned to be the final units in a laser system 200 and will be the first modules susceptible to thermal damage, including but not limited to thermal fracture or excessive thermal lensing.

Laser pre-amplifiers can include single pass pre-amplifiers usable in systems not overly concerned with energy efficiency. For more energy efficient systems, multi-pass pre-amplifiers can be configured to extract much of the energy from each pre-amplifier 204 before going to the next stage. The number of pre-amplifiers 402 needed for a particular system is defined by system requirements and the stored energy/gain available in each amplifier module. Multi-pass pre-amplification can be accomplished through angular multiplexing or polarization switching (e.g. using waveplates or Faraday rotators).

Alternatively, pre-amplifiers can include cavity structures with a regenerative amplifier type configuration. While such cavity structures can limit the maximum pulse length due to mechanical considerations (e.g. length of cavity), in some embodiments "white cell" cavities can be used. A "white cell" is a multi-pass cavity architecture in which a small angular deviation is added to each pass. By providing an entrance and exit pathway, such a cavity can be designed to have extremely large number of passes between entrance and exit allowing for large gain and efficient use of the amplifier. One example of a white cell would be a confocal cavity with beams injected slightly off axis and mirrors tilted such that the reflections create a ring pattern on the mirror after many passes. By adjusting the injection and mirror angles the number of passes can be changed.

Amplifiers are also used to provide enough stored energy to meet system energy requirements, while supporting sufficient thermal management to enable operation at system required repetition rate whether they are diode or flashlamp pumped.

Amplifiers can be configured in single and/or multi-pass or cavity type architectures. Amplifiers can include single pass amplifiers usable in systems not overly concerned with energy efficiency. For more energy efficient systems, multi-pass amplifiers can be configured to extract much of the energy from each amplifier before going to the next stage. The number of amplifiers needed for a particular system is defined by system requirements and the stored energy/gain available in each amplifier module. Multipass pre-amplification can be accomplished through angular multiplexing, polarization switching (waveplates, Faraday rotators). Alternatively, amplifiers can include cavity structures with a regenerative amplifier type configuration. As discussed with respect to pre-amplifiers, amplifiers can be used for power amplification.

In some embodiments, the cooling systems 208 can include passive or active fluid pumping systems. Sensors can be used by controller 220 to determine light transmission or laser light absorption characteristics. In some embodiments, waste heat can be used to increase temperature of connected components. As will be appreciated, laser flux and energy can be scaled in this architecture by adding more pre-amplifiers and amplifiers with appropriate thermal management and optical isolation. Adjustments to heat removal characteristics of the cooling system are possible, with increase in pump rate or changing cooling efficiency being used to adjust performance.

Figure 3:
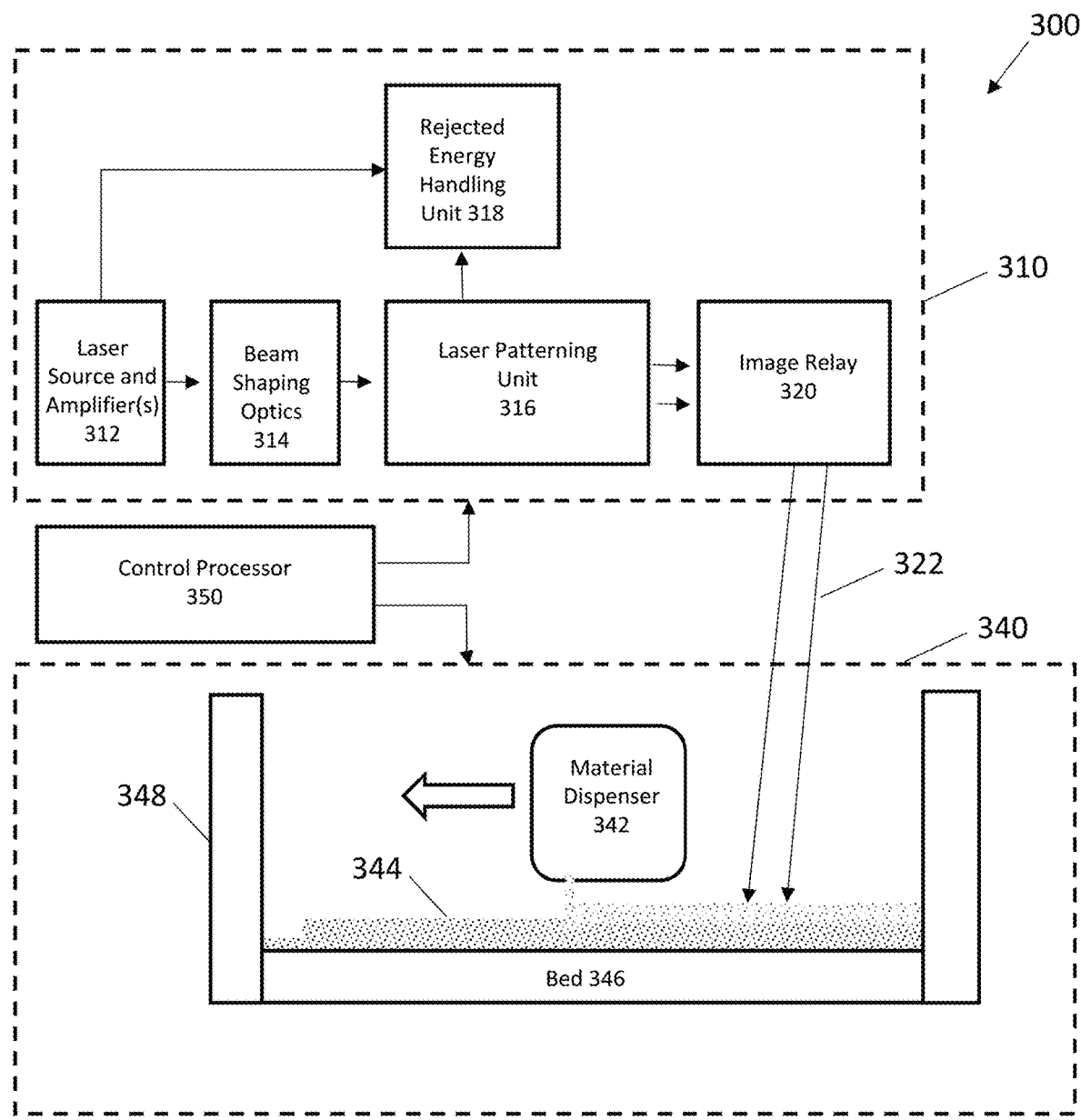
FIG. 3 illustrates a high fluence light valve based additive manufacturing system.

FIG. 3 illustrates use of a light valve based additive manufacturing system 300. As seen in FIG. 3, a laser source and amplifier(s) 312 can include cooled laser amplifiers and other components such as previously describe. As illustrated in FIG. 3, the additive manufacturing system 300 uses lasers able to provide one- or two-dimensional directed energy as part of a laser patterning system 310. In some embodiments, one dimensional patterning can be directed as linear or curved strips, as rastered lines, as spiral lines, or in any other suitable form. Two-dimensional patterning can include separated or overlapping tiles, or images with variations in laser intensity. Two-dimensional image patterns having non-square boundaries can be used, overlapping or interpenetrating images can be used, and images can be provided by two or more energy patterning systems. The laser patterning system 310 uses laser source and amplifier(s) 312 to direct one or more continuous or intermittent energy beam(s) toward beam shaping optics 314. After shaping, if necessary, the beam is patterned by a laser patterning unit 316 that includes either a transmissive or reflective light valve, with generally some energy being directed to a rejected energy handling unit 318. Patterned energy is relayed by image relay 320 toward an article processing unit 340, in one embodiment as a two-dimensional image 322 focused near a bed 346. The bed 346 (with optional walls 348) can form a chamber containing material 344 (e.g. a metal powder) dispensed by material dispenser 342. Patterned energy, directed by the image relay 320, can melt, fuse, sinter, amalgamate, change crystal structure, influence stress patterns, or otherwise chemically or physically modify the dispensed material 344 to form structures with desired properties. A control processor 350 can be connected to variety of sensors, actuators, heating or cooling systems, monitors, and controllers to coordinate operation of the laser source and amplifier(s) 312, beam shaping optics 314, laser patterning unit 316, and image relay 320, as well as any other component of system 300. As will be appreciated, connections can be wired or wireless, continuous, or intermittent, and include capability for feedback (for example, thermal heating can be adjusted in response to sensed temperature).

In some embodiments, beam shaping optics 314 can include a great variety of imaging optics to combine, focus, diverge, reflect, refract, homogenize, adjust intensity, adjust frequency, or otherwise shape and direct one or more laser beams received from the laser source and amplifier(s) 312 toward the laser patterning unit 316. In one embodiment, multiple light beams, each having a distinct light wavelength, can be combined using wavelength selective mirrors (e.g. dichroics) or diffractive elements. In other embodiments, multiple beams can be homogenized or combined using multifaceted mirrors, microlenses, and refractive or diffractive optical elements.

Laser patterning unit 316 can include static or dynamic energy patterning elements. For example, laser beams can be blocked by masks with fixed or movable elements. To increase flexibility and ease of image patterning, pixel addressable masking, image generation, or transmission can be used. In some embodiments, the laser patterning unit includes addressable light valves, alone or in conjunction with other patterning mechanisms to provide patterning. The light valves can be transmissive, reflective, or use a combination of transmissive and reflective elements. Patterns can be dynamically modified using electrical or optical addressing. In one embodiment, a transmissive optically addressed light valve acts to rotate polarization of light passing through the valve, with optically addressed pixels forming patterns defined by a light projection source. In another embodiment, a reflective optically addressed light valve includes a write beam for modifying polarization of a read beam. In certain embodiments, non-optically addressed light valves can be used. These can include but are not limited to electrically addressable pixel elements, movable mirror or micro-mirror systems, piezo or micro-actuated optical systems, fixed or movable masks, or shields, or any other conventional system able to provide high intensity light patterning.

Rejected energy handling unit 318 is used to disperse, redirect, or utilize energy not patterned and passed through the image relay 320. In one embodiment, the rejected energy handling unit 318 can include passive or active cooling elements that remove heat from both the laser source and amplifier(s) 312 and the laser patterning unit 316. In other embodiments, the rejected energy handling unit can include a "beam dump" to absorb and convert to heat any beam energy not used in defining the laser pattern. In still other embodiments, rejected laser beam energy can be recycled using beam shaping optics 314. Alternatively, or in addition, rejected beam energy can be directed to the article processing unit 340 for heating or further patterning. In certain embodiments, rejected beam energy can be directed to additional energy patterning systems or article processing units.

In one embodiment, a "switchyard" style optical system can be used. Switchyard systems are suitable for reducing the light wasted in the additive manufacturing system as caused by rejection of unwanted light due to the pattern to be printed. A switchyard involves redirections of a complex pattern from its generation (in this case, a plane whereupon a spatial pattern is imparted to structured or unstructured beam) to its delivery through a series of switch points. Each switch point can optionally modify the spatial profile of the incident beam. The switchyard optical system may be utilized in, for example and not limited to, laser-based additive manufacturing techniques where a mask is applied to the light. Advantageously, in various embodiments in accordance with the present disclosure, the thrown-away energy may be recycled in either a homogenized form or as a patterned light that is used to maintain high power efficiency or high throughput rates. Moreover, the thrown-away energy can be recycled and reused to increase intensity to print more difficult materials.

Image relay 320 can receive a patterned image (either one or two-dimensional) from the laser patterning unit 316 directly or through a switchyard and guide it toward the article processing unit 340. In a manner similar to beam shaping optics 314, the image relay 320 can include optics to combine, focus, diverge, reflect, refract, adjust intensity, adjust frequency, or otherwise shape and direct the patterned light. Patterned light can be directed using movable mirrors, prisms, diffractive optical elements, or solid-state optical systems that do not require substantial physical movement. One of a plurality of lens assemblies can be configured to provide the incident light having the magnification ratio, with the lens assemblies both a first set of optical lenses and a second sets of optical lenses, and with the second sets of optical lenses being swappable from the lens assemblies. Rotations of one or more sets of mirrors mounted on compensating gantries and a final mirror mounted on a build platform gantry can be used to direct the incident light from a precursor mirror onto a desired location. Translational movements of compensating gantries and the build platform gantry are also able to ensure that distance of the incident light from the precursor mirror the article processing unit 340 is substantially equivalent to the image distance. In effect, this enables a quick change in the optical beam delivery size and intensity across locations of a build area for different materials while ensuring high availability of the system.

Article processing unit 340 can include a walled chamber 348 and bed 344 (collectively defining a build chamber), and a material dispenser 342 for distributing material. The material dispenser 342 can distribute, remove, mix, provide gradations or changes in material type or particle size, or adjust layer thickness of material. The material can include metal, ceramic, glass, polymeric powders, other melt-able material capable of undergoing a thermally induced phase change from solid to liquid and back again, or combinations thereof. The material can further include composites of melt-able material and non-melt-able material where either or both components can be selectively targeted by the imaging relay system to melt the component that is melt-able, while either leaving along the non-melt-able material or causing it to undergo a vaporizing/destroying/combusting or otherwise destructive process. In certain embodiments, slurries, sprays, coatings, wires, strips, or sheets of materials can be used. Unwanted material can be removed for disposable or recycling by use of blowers, vacuum systems, sweeping, vibrating, shaking, tipping, or inversion of the bed 346.

In addition to material handling components, the article processing unit 340 can include components for holding and supporting 3D structures, mechanisms for heating or cooling the chamber, auxiliary or supporting optics, and sensors and control mechanisms for monitoring or adjusting material or environmental conditions. The article processing unit can, in whole or in part, support a vacuum or inert gas atmosphere to reduce unwanted chemical interactions as well as to mitigate the risks of fire or explosion (especially with reactive metals). In some embodiments, various pure or mixtures of other atmospheres can be used, including those containing Ar, He, Ne, Kr, Xe, $CO_2$, $N_2$, $O_2$, $SF_6$, $CH_4$, CO, $N_2O$, $C_2H_2$, $C_2H_4$, $C_2H_6$, $C_3H_6$, $C_3H_8$, i-$C_4H_{10}$, $C_4H_{10}$, 1-$C_4H_8$, cic-2, $C_4H_7$, 1,3-$C_4H_6$, 1,2—$C_4H_6$, $C_5H_{12}$, n-$C_5H_{12}$, i-$C_5H_{12}$, n-$C_6H_{14}$, $C_2H_3Cl$, $C_7H_{16}$, $C_8H_{18}$, $C_{10}H_{22}$, $C_{11}H_{24}$, $C_{12}H_{26}$, $C_{13}H_{28}$, $C_{14}H_{30}$, $C_{15}H_{32}$, $C_{16}H_{34}$, $C_6H_6$, $C_6H_5$—$CH_3$, $C_8H_{10}$, $C_2H_5OH$, $CH_3OH$, i$C_4H_8$. In some embodiments, refrigerants or large inert molecules (including but not limited to sulfur hexafluoride) can be used. An enclosure atmospheric composition to have at least about 1% He by volume (or number density), along with selected percentages of inert/non-reactive gasses can be used.

In certain embodiments, a plurality of article processing units or build chambers, each having a build platform to hold a powder bed, can be used in conjunction with multiple optical-mechanical assemblies arranged to receive and direct the one or more incident energy beams into the build chambers. Multiple chambers allow for concurrent printing of one or more print jobs inside one or more build chambers. In other embodiments, a removable chamber sidewall can simplify removal of printed objects from build chambers, allowing quick exchanges of powdered materials. The chamber can also be equipped with an adjustable process temperature controls. In still other embodiments, a build chamber can be configured as a removable printer cartridge positionable near laser optics. In some embodiments a removable printer cartridge can include powder or support detachable connections to a powder supply. After manufacture of an item, a removable printer cartridge can be removed and replaced with a fresh printer cartridge.

In another embodiment, one or more article processing units or build chambers can have a build chamber that is maintained at a fixed height, while optics are vertically movable. A distance between final optics of a lens assembly and a top surface of powder bed a may be managed to be essentially constant by indexing final optics upwards, by a distance equivalent to a thickness of a powder layer, while keeping the build platform at a fixed height. Advantageously, as compared to a vertically moving the build platform, large and heavy objects can be more easily manufactured, since precise micron scale movements of the ever-changing mass of the build platform are not needed. Build chambers intended for metal powders with a volume more than ~0.1-0.2 cubic meters (i.e., greater than 100-200 liters or heavier than 500-1,000 kg) can greatly benefit from keeping the build platform at a fixed height.

In one embodiment, a portion of the layer of the powder bed may be selectively melted or fused to form one or more temporary walls out of the fused portion of the layer of the powder bed to contain another portion of the layer of the powder bed on the build platform. In selected embodiments, a fluid passageway can be formed in the one or more first walls to enable improved thermal management.

In some embodiments, the additive manufacturing system can include article processing units or build chambers with a build platform that supports a powder bed capable of tilting, inverting, and shaking to separate the powder bed substantially from the build platform in a hopper. The powdered material forming the powder bed may be collected in a hopper for reuse in later print jobs. The powder collecting process may be automated and vacuuming or gas jet systems also used to aid powder dislodgement and removal.

Some embodiments, the additive manufacturing system can be configured to easily handle parts longer than an available build chamber. A continuous (long) part can be sequentially advanced in a longitudinal direction from a first zone to a second zone. In the first zone, selected granules of a granular material can be amalgamated. In the second zone, unamalgamated granules of the granular material can be removed. The first portion of the continuous part can be advanced from the second zone to a third zone, while a last portion of the continuous part is formed within the first zone and the first portion is maintained in the same position in the lateral and transverse directions that the first portion occupied within the first zone and the second zone. In effect, additive manufacture and clean-up (e.g., separation and/or reclamation of unused or unamalgamated granular material) may be performed in parallel (i.e., at the same time) at different locations or zones on a part conveyor, with no need to stop for removal of granular material and/or parts.

In another embodiment, additive manufacturing capability can be improved by use of an enclosure restricting an exchange of gaseous matter between an interior of the enclosure and an exterior of the enclosure. An airlock provides an interface between the interior and the exterior; with the interior having multiple additive manufacturing chambers, including those supporting power bed fusion. A gas management system maintains gaseous oxygen within the interior at or below a limiting oxygen concentration, increasing flexibility in types of powder and processing that can be used in the system.

In another manufacturing embodiment, capability can be improved by having an article processing units or build chamber contained within an enclosure, the build chamber being able to create a part having a weight greater than or equal to 2,000 kilograms. A gas management system may maintain gaseous oxygen within the enclosure at concentrations below the atmospheric level. In some embodiments, a wheeled vehicle may transport the part from inside the enclosure, through an airlock, since the airlock operates to buffer between a gaseous environment within the enclosure and a gaseous environment outside the enclosure, and to a location exterior to both the enclosure and the airlock.

Other manufacturing embodiments involve collecting powder samples in real-time from the powder bed. An ingester system is used for in-process collection and characterizations of powder samples. The collection may be performed periodically and the results of characterizations result in adjustments to the powder bed fusion process. The ingester system can optionally be used for one or more of audit, process adjustments or actions such as modifying printer parameters or verifying proper use of licensed powder materials.

Yet another improvement to an additive manufacturing process can be provided by use of a manipulator device such as a crane, lifting gantry, robot arm, or similar that allows for the manipulation of parts that would be difficult or impossible for a human to move is described. The manipulator device can grasp various permanent or temporary additively manufactured manipulation points on a part to enable repositioning or maneuvering of the part.

Control processor 350 can be connected to control any components of additive manufacturing system 300 described herein, including lasers, laser amplifiers, optics, heat control, build chambers, and manipulator devices. The control processor 350 can be connected to variety of sensors, actuators, heating or cooling systems, monitors, and controllers to coordinate operation. A wide range of sensors, including imagers, light intensity monitors, thermal, pressure, or gas sensors can be used to provide information used in control or monitoring. The control processor can be a single central controller, or alternatively, can include one or more independent control systems. The controller processor 350 is provided with an interface to allow input of manufacturing instructions. Use of a wide range of sensors allows various feedback control mechanisms that improve quality, manufacturing throughput, and energy efficiency.

Figure 4:
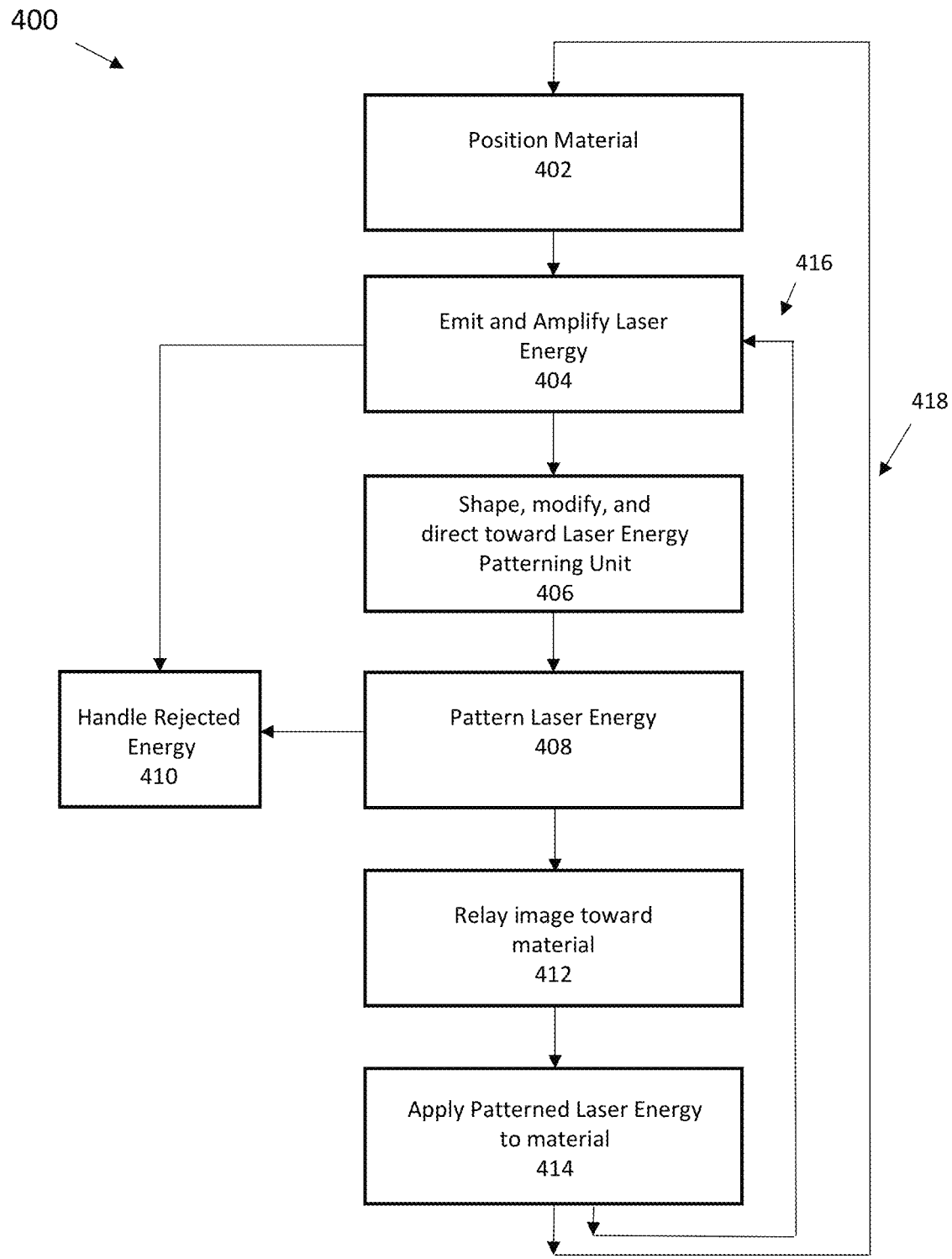
FIG. 4 illustrates another embodiment of a high fluence light valve based additive manufacturing system.

One embodiment of operation of a manufacturing system suitable for additive or subtractive manufacture is illustrated in FIG. 4. In this embodiment, a flow chart 400 illustrates one embodiment of a manufacturing process supported by the described optical and mechanical components. In step 402, material is positioned in a bed, chamber, or other suitable support. The material can be a metal plate for laser cutting using subtractive manufacture techniques, or a powder capable of being melted, fused, sintered, induced to change crystal structure, have stress patterns influenced, or otherwise chemically or physically modified by additive manufacturing techniques to form structures with desired properties.

In step 404, unpatterned laser energy is emitted by one or more energy emitters, including but not limited to solid state or semiconductor lasers, and then amplified by one or more laser amplifiers. In step 406, the unpatterned laser energy is shaped and modified (e.g. intensity modulated or focused). In step 408, this unpatterned laser energy is patterned, with energy not forming a part of the pattern being handled in step 410 (this can include conversion to waste heat, recycling as patterned or unpatterned energy, or waste heat generated by cooling the laser amplifiers in step 404). In step 412, the patterned energy, now forming a one or two-dimensional image is relayed toward the material. In step 414, the image is applied to the material, either subtractively processing or additively building a portion of a 3D structure. For additive manufacturing, these steps can be repeated (loop 416) until the image (or different and subsequent image) has been applied to all necessary regions of a top layer of the material. When application of energy to the top layer of the material is finished, a new layer can be applied (loop 418) to continue building the 3D structure. These process loops are continued until the 3D structure is complete, when remaining excess material can be removed or recycled.

Figure 5:
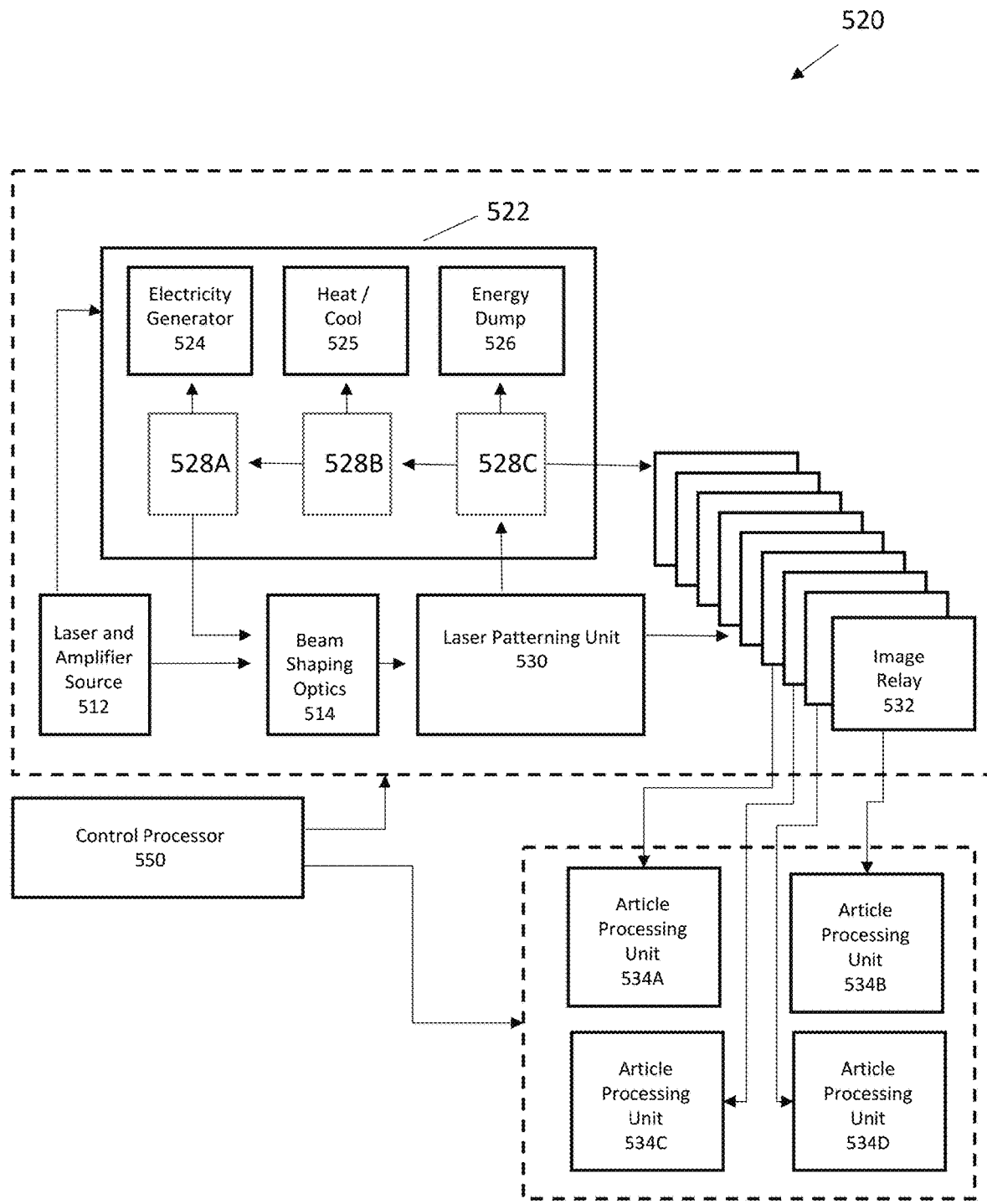
FIG. 5 illustrates another embodiment of a high fluence light valve based additive manufacturing which incorporates a switchyard approach for recovery and further usage of waste energy.

FIG. 5 is one embodiment of an additive manufacturing system that includes a switchyard system enabling reuse of patterned two-dimensional energy. An additive manufacturing system 520 has an energy patterning system with a laser and amplifier source 512 that directs one or more continuous or intermittent laser beam(s) toward beam shaping optics 514. Excess heat can be transferred into a rejected energy handling unit 522. After shaping, the beam is two-dimensionally patterned by an energy patterning unit 530, with generally some energy being directed to the rejected energy handling unit 522. Patterned energy can be relayed by one of multiple image relays 532 toward one or more article processing units 534A, 534B, 534C, or 534D, providing a two-dimensional image focused near a movable or fixed height bed. The bed be inside a cartridge that includes a powder hopper or similar material dispenser. Patterned laser beams, directed by the image relays 532, can melt, fuse, sinter, amalgamate, change crystal structure, influence stress patterns, or otherwise chemically or physically modify the dispensed material to form structures with desired properties.

In this embodiment, the rejected energy handling unit has multiple components to permit reuse of rejected patterned energy. Coolant fluid from the laser amplifier and source 512 can be directed into one or more of an electricity generator 524, a heat/cool thermal management system 525, or an energy dump 526. Additionally, relays 528A, 528B, and 52C can respectively transfer energy to the electricity generator 524, the heat/cool thermal management system 525, or the energy dump 526. Optionally, relay 528C can direct patterned energy into the image relay 532 for further processing. In other embodiments, patterned energy can be directed by relay 528C, to relay 528B and 528A for insertion into the laser beam(s) provided by laser and amplifier source 512. Reuse of patterned images is also possible using image relay 532. Images can be redirected, inverted, mirrored, sub- patterned, or otherwise transformed for distribution to one or more article processing units. 534A-D. Advantageously, reuse of the patterned light can improve energy efficiency of the additive manufacturing process, and in some cases improve energy intensity directed at a bed or reduce manufacture time.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A light modulator, comprising:
first and second transparent conductive oxide layers;
a photoconductive layer positioned between the first and a second transparent conductive oxide layers, the photoconductive layer having main impurities of less than 5.0% and general impurities of less than 1.0%; and
an electro-optical layer positioned in contact with the photoconductive layer.

2. The light modulator of claim 1, wherein general impurities include at least one of $H_2O$ (water), Ag, Cd, Cl, Cu, Mg, Na, Pb, $SO_4$, and Zn.

3. The light modulator of claim 1, wherein main impurities include at least one of Germanium, Sulfur, and Tungsten.

4. The light modulator of claim 1, wherein main impurities are less than 0.1%.

5. The light modulator of claim 1, wherein the photoconductive layer contains Bismuth.

6. The light modulator of claim 1, wherein the photoconductive layer is at least one of Bismuth Silicate ($Bi_2SiO_3$, $Bi_6SiO_{10}$, $Bi_{12}SiO_{20}$, (BGO) Bismuth Germanate (BGO, $Bi_2GeO_3$, $Bi_6GeO_{10}$, $Bi_{12}GeO_{20}$, $Bi_{25}GeO_{39}$), Bismuth Titanite (BTO, $Bi_{12}T_{0.9}O_{19.8}$), Bismuth Zirconate (BZO, $Bi_{38}ZO_{38}$), Bismuth Ferrate (BFO, $Bi_{25}FeO_{39}$), Bismuth Borate (BBO, $Bi_{24}BO_{39}$), Bismuth Aluminum Phosphate (BAPO, $Bi_{24}AlPO_{40}$), Bismuth Gallium Phosphate (BGPO, $Bi_{24}GaPO_{40}$), Bismuth Gallium Vanadate (BFVO, $Bi_{24}GaVnO_{40}$), Bismuth Zirconium Vanadate ($Bi_{36}ZnVnO_{60}$), Aluminum Zinc Oxide (AZO), Cadmium Sulfide (CdS), Cadmium Selenide (CdSe), Zinc Sulfide (ZnS), Zinc Selenide (ZnSe), Indium Sulfide ($In_2S_3$), Lead Sulfide (PbS), Cadmium Zinc Telluride (CdZTe), doped Germanium (n:Ge, p:Ge) amorphous Silicon ($\alpha$-Si), doped Silicon (n:Si, p:Si), and Mercury Iodide ($HgI_2$).

7. The light modulator of claim 1, wherein the photoconductive layer is a directly deposited thin film.

8. The light modulator of claim 1, wherein the photoconductor layer further comprises one of a doped glass, chalcogenide glass, and quantum dot.

9. The light modulator of claim 1, wherein the first and second transparent conductive oxide layers are at least one of an aluminum doped zinc oxide, fluorine doped tin oxide, doped graphene, doped chalcogenide, and exfoliated two-dimensional disulfide.

10. The light modulator of claim 1, wherein the first and second transparent conductive oxide layers are directly deposited thin films.

11. The light modulator of claim 1, wherein the photoconductive layer is in contact with the first transparent conductive layer, with the photoconductive layer positionable to receive a write beam that defines a two-dimensional spatial pattern.

12. The light modulator of claim 1, wherein the electro-optical layer is at least one of a liquid crystal or quantum dot.

13. The light modulator of claim 1, wherein the electro-optical layer comprises a liquid crystal layer that contains chiral or dopants to reduce viscosity to less than 0.5 Pa·s.

14. The light modulator of claim 1, wherein the electro-optical layer comprises a liquid crystal operated at above 25C to achieve viscosity less than 0.5 Pa·s.

15. A light modulator, comprising:
    first and second transparent conductive oxide layers;
    an electro-optical layer positioned between the first and second transparent conductive oxide layers;
    a photoconductive layer; and
    at least one of a thermally insulative layer and a thermally conductive layer positioned between the first and second transparent conductive oxide layers,
    wherein the electro-optical layer is laterally offset or rotated with respect to the photoconductive layer to permit external electrical contact with the first and second transparent conductive oxide layers.

16. The light modulator of claim 15, wherein the electro-optical layer is a liquid crystal layer.

17. The light modulator of claim 15, wherein at least two separate thermally conductive layers are respectively positioned on each side of the electro-optical layer.

18. The light modulator of claim 15, wherein at least two thermally insulative layers are respectively positioned on each side of the electro-optical layer.

19. The light modulator of claim 15, wherein at least two separate thermally conductive layers are respectively positioned on top of the transparent conductor layer.

20. The light modulator of claim 15, wherein at least two separate thermally insulative layers are respectively positioned on each side of the electro-optical layer, and further comprising at least two thermally conductive layers positioned on top of the transparent conductor layer.

21. The light modulator of claim 15, further comprising a fluid coolant system.

22. A reflective light modulator, comprising:
    first and second transparent conductive oxide layers;
    a photoconductive layer positioned between the first and second transparent conductive oxide layers;
    an electro-optical layer; and
    a reflective layer between the photoconductive layer and the electro-optical,
    wherein the electro-optical layer is laterally offset or rotated with respect to the photoconductive layer to permit external electrical contact with the first and second transparent conductive oxide layers.

23. The reflective light modulator of claim 22, further comprising at least one of a thermally insulative layer and a thermally conductive layer positioned between the first and second transparent conductive oxide layers.

24. A light modulator, comprising:
    a thermal conductive top substrate assembly;
    an electro-optics assembly with a first transparent conductive oxide layer;
    a photoconductor assembly with a second transparent conductive oxide layer, wherein the electro-optics assembly and the photoconductor assembly have a same shape; and
    a supporting thermal conductive substrate assembly,
    wherein the electro-optics assembly is laterally offset or rotated with respect to the photoconductor assembly to permit external electrical contact with the respective first and second transparent conductive oxide layers.

25. The light modulator of claim 24, wherein a thermally conductive layer in at least one of the thermal conductive top substrate assembly and the supporting thermal conductive substrate assembly has a thermal conductivity >5 W/m-K.

* * * * *